United States Patent
Hertz et al.

(10) Patent No.: US 8,237,557 B1
(45) Date of Patent: Aug. 7, 2012

(54) PICKUP TRUCK TAILGATE SAFETY LIGHT SYSTEM

(76) Inventors: Allen D Hertz, Boca Raton, FL (US); Eric L Hertz, Satellite Beach, FL (US)

( * ) Notice: Subject to any disclaimer, the term of this patent is extended or adjusted under 35 U.S.C. 154(b) by 0 days.

(21) Appl. No.: 12/947,659

(22) Filed: Nov. 16, 2010

Related U.S. Application Data

(63) Continuation-in-part of application No. 11/562,389, filed on Nov. 21, 2006, now Pat. No. 7,834,750.

(60) Provisional application No. 60/793,849, filed on Apr. 20, 2006, provisional application No. 60/742,471, filed on Dec. 5, 2005, provisional application No. 60/739,069, filed on Nov. 22, 2005.

(51) Int. Cl.
*B60Q 1/26* (2006.01)
(52) U.S. Cl. .................... 340/468; 340/469; 362/496
(58) Field of Classification Search .................. 340/468, 340/469, 485, 471, 472; 362/487, 496, 505
See application file for complete search history.

(56) References Cited

U.S. PATENT DOCUMENTS

| 7,425,088 B2 * | 9/2008 | Weitzel | 362/540 |
| 2005/0146888 A1 * | 7/2005 | Metcalf | 362/541 |

* cited by examiner

*Primary Examiner* — Toan N Pham
(74) *Attorney, Agent, or Firm* — Allen D. Hertz, P.A.; Allen D. Hertz

(57) ABSTRACT

A safety light system is incorporated into the tailgate of a pickup truck. The safety light is incorporated into the tailgate and is illuminated when the tailgate is in a lowered or horizontal position and when either the ignition switch is in the on position, the parking lights are turned on, or both. The safety light can be positioned either on the top edge-rail of the tailgate, as a slide-out unit placed in a pocket with the top edge-rail of the tailgate, or as a rotating assembly incorporated into the outer sheet metal of the tailgate. Additional safety lights can be incorporated into the sides of the tailgate assembly. An optional feature includes the ability to pull the safety light out from the tailgate and secure the safety light to an object that extends beyond the length of the pickup bed. Alternatively, the safety lights can be installed in or on a bed extension apparatus. The safety light can additionally include the features of a standard taillight, comprising brake lights and or turn signal indicators. Alternates include reflective tape and a pullout feature from other locations. A pullout section can also provide a step for accessing the bed.

20 Claims, 23 Drawing Sheets

PICKUP TRUCK TAILGATE SAFETY LIGHT SYSTEM

RELATED PATENT APPLICATION(S)

This application is a Continuation-In-Part Application which claims priority to Non-Provisional patent application Ser. No. 11/562,389 filed on Nov. 21, 2006, which claims priority to Provisional Patent Application 60/793,849 filed on Apr. 20, 2006, Provisional Patent Application 60/742,471 filed on Dec. 5, 2005, and Provisional Patent Application 60/739,069 filed on Nov. 22, 2005, all of which are incorporated herein by reference.

FIELD OF THE INVENTION

The present invention relates to a tailgate safety light for a pickup truck, more specifically tailgate edge warning light integrated into a top surface of the tailgate.

BACKGROUND OF THE INVENTION

It is a common practice to position a tailgate of a pickup truck in a horizontal position when carrying loads that are longer than the internal length of the pickup bed. When carrying such a load, the user normally couples a red material to the end of the load to indicate to others of the extended length and location of the end of the load.

Several issues arise when positioning the tailgate of a pickup truck in a horizontal position. The first issue is the loss of protection by the bumper. Another being the potential for an accident wherein a vehicle behind the pickup truck would run into the carried load or the horizontal tailgate. On darker color trucks, it is more difficult to recognize when a tailgate is in a horizontal position at night. On a lighter color truck, it is more difficult to recognize when a tailgate is in a horizontal position during daylight. This is critical from both a rear view and a side view.

Pickup Trucks have been evolving. Pickup Trucks previously comprised of two doors, a bench seat, and a bed length of 8 feet. Current designs of pickup trucks are directed towards four doors, a luxury interior, and a shorter, somewhere between a 5½ and 6½ foot bed length. This change is directed more users to drive with the tailgate down.

A large number of states require red flags being at least 1 square foot be attached to objects that project 4 feet or more beyond the end of a vehicle. Additionally, a light or reflector is required to be attached to the object after dusk.

Fox (U.S. Pat. No. 6,799,873) teaches a third brake light, placing a "U" shaped attachment over the top edge of the tailgate. Fox is limited in a non-permanent item. The teachings need to be removable as it is highly susceptible to damage when loading cargo into the pickup bed, as it is taught to be an elevated object. Fox further teaches a unit that is only a third brake light assembly, similar to those integrated into current vehicles. Third brake lights are only illuminated when pressure is applied to the brakes. Therefore, Fox is teaching a means for additionally notifying another driver that the vehicle is braking.

What is desired is a tailgate safety light system, providing other drivers a means for continuously warning them that the tailgate is in a horizontal position and further providing others with the location of the end of the tailgate/extended load.

When a tailgate is up (vertical), the rearmost dimension of a vehicle is normally the bumper. When the tailgate is lowered (horizontal), the rearmost dimension of a vehicle is the top edge of the tailgate. When the tailgate is lowered, a vehicle containing rear proximity sensors no longer references the most rearward dimension of the vehicle.

What is desired is a means for utilising said rear proximity sensors to reference the rearmost dimension of the vehicle, more so as the rearmost point changes.

SUMMARY OF THE INVENTION

One aspect of the present invention is a tailgate comprising a taillight positioned proximate the top surface of the tailgate.

A second aspect of the present invention is a tailgate comprising a taillight positioned within a recess within said top surface of the tailgate.

A third aspect of the present invention is a tailgate comprising a taillight wherein said taillight remains illuminated when the tailgate is in a horizontal position.

A fourth aspect of the present invention is a tailgate comprising a taillight wherein said taillight remains illuminated when the tailgate is in a horizontal position and the ignition switch is turned on.

A fifth aspect of the present invention is a tailgate comprising a taillight wherein said taillight comprising two illumination levels, a low level and a high level.

A sixth aspect of the present invention is a tailgate comprising a taillight wherein said taillight comprising two illumination levels, a low level and a high level, wherein said taillight is wired to further indicate when the vehicle is braking.

A seventh aspect of the present invention is a tailgate comprising a taillight wherein said taillight comprising two illumination levels, a low level and a high level, wherein said taillight is wired to further indicate when the vehicle is braking.

An eighth aspect of the present invention is a tailgate comprising a taillight wherein said taillight comprising two illumination levels, a low level and a high level, wherein said taillight is wired to further indicate desired vehicle turning direction.

A ninth aspect of the present invention is a device comprising a sensor, wherein said sensor indicates when said tailgate is positioned in a horizontal position.

An eleventh aspect of the present invention is a device comprising a sensor, wherein said sensor indicates when said tailgate is positioned in a horizontal position, said sensor being a tilt indicator.

A twelfth aspect of the present invention is a device comprising a sensor, wherein said sensor indicates when said tailgate is positioned in a horizontal position, said sensor being a switch which changes state when the tailgate is rotated away from the sidewall of the bed of the pickup truck.

A thirteenth aspect of the present invention is wherein said taillight is of an incandescent bulb.

A fourteenth aspect of the present invention is wherein said taillight is of at least on of an LED and a plurality of LED's.

A fifteenth aspect of the present invention utilizes a hinged light, wherein said hinged light is parallel and flush to the tailgate when the tailgate is upright. When the tailgate is rotated into a horizontal position, the safety light assembly rotates away from the sheet metal of the tailgate, maintaining a vertical position, but is then hanging from and perpendicular to the horizontal tailgate.

A sixteenth aspect of the present invention utilizes a slide-able safety light assembly; wherein said slide-able safety light assembly is vertical and inserted into the tailgate from the top edge of the tailgate when the tailgate is upright. When the tailgate is rotated into a horizontal position, the user would slide the slide-able safety light assembly out from within the tailgate, maintaining a position parallel to the tailgate, but a portion containing the light is then rotated into a position, which is perpendicular to the horizontal tailgate.

A seventeenth aspect of the present invention utilizes a temporary holding mechanism to temporarily hold the light in the desired position. An example secures the rotating portion of the safety light in a vertical position when the tailgate is in a horizontal position, thus maintaining the light steady over bumps.

An eighteenth aspect of the present invention utilises a temporary holding mechanism to temporarily hold the light in the desired position, wherein said temporary holding mechanism comprising a ball and spring.

A nineteenth aspect of the present invention incorporates lights into the outboard side of the tailgate, wherein said lights are used to notify other drivers oblique to the direction of travel of subject vehicle that the tailgate is in a lowered position, and where the end of the tailgate is.

A twentieth aspect of the present invention incorporates lights into a tailgate bed extension apparatus, which is utilised to extend the bed length of the pickup truck. Such tailgate bed extension apparatus can comprise any known such designs.

A twenty-first aspect of the present invention incorporates a removable tailgate safety light assembly; wherein said removable tailgate safety light assembly is then temporarily coupled to an object that overhangs the rear edge of the pickup truck bed.

A twenty-second aspect of the present invention provides a method for compensating for a change in the rearmost position of a pickup truck. It is recognized that the same method can be applied to other vehicles such as Sport Utility Vehicles.

A twenty-third aspect of the present invention is the utilization of reflectors behind an illumination source to assist in directing the highest light intensity output.

A twenty-forth aspect of the present invention is the utilization of at least one of a red lens and an amber lens.

A twenty-fifth aspect of the present invention is the utilization of at least one of a red-colored bulb/LED and an amber-colored bulb/LED.

A twenty-sixth aspect of the present invention incorporates a removable tailgate safety light assembly; wherein said removable tailgate safety light assembly is provided power via at least one of retractable wires and rechargeable battery power.

A twenty-seventh aspect of the present invention provides a method for compensating for a change in the rearmost position of a pickup truck for a rear proximity sensing apparatus, wherein said method recognizes when the tailgate is in a horizontal orientation. The system contains at least two calibration factors: 1) Tailgate up and 2) tailgate down. When said tailgate is in a horizontal orientation, the system utilizes a tailgate down calibration factor for the rear proximity sensors—to determine the distance from an object to the furthest most point of the lowered tailgate. When said tailgate is in a vertical orientation, the system utilizes a tailgate up calibration factor for the rear proximity sensors—to determine the distance from an object to the furthest most point of the vehicle—normally the rear bumper.

A twenty-eighth aspect of the present invention is the incorporation of rear proximity sensors into the top edge of a tailgate.

A twenty-ninth aspect of the present invention is the utilization of a reflective medium to replace said tailgate safety lights for at least one of the tailgate safety light features.

A thirtieth aspect of the present invention is the utilization of reflective medium on the side of said tailgate.

A thirty-first aspect of the present invention is the utilization of reflector tape as said reflective medium.

A thirty-second aspect of the present invention is the utilization of a glass reflector as said reflective medium.

A thirty-third aspect of the present invention is the utilization of a plastic reflector as said reflective medium.

A thirty-fourth aspect of the present invention is the inclusion of said safety features in or onto a tailgate protective apparatus.

A thirty-fifth aspect of the present invention is the inclusion of said safety features in or onto a molded tailgate protective apparatus.

A thirty-sixth aspect of the present invention is the utilization of a tailgate safety light that is visible from both the rear of the tailgate and the top of the tailgate.

A thirty-seventh aspect of the present invention is a tailgate safety light, said tailgate safety light comprising an elongated illumination section and at least one end illumination section.

A thirty-eighth aspect of the present invention is a tailgate safety light, said tailgate safety light comprising a removable assembly and a securing member.

A thirty-ninth aspect of the present invention is a tailgate safety light, said tailgate safety light comprising a removable assembly, a securing member, and a spring release member.

A fortieth aspect of the present invention is a reflective medium, wherein said reflective medium is of any color.

A forty-first aspect of the present invention is a tailgate safety light, said tailgate safety light being of any legal color, including amber, red, green, blue, and the like.

A forty-second aspect of the present invention is a pullout safety apparatus, wherein said pullout safety apparatus is an assembly that couples to the hitch receiver.

A forty-third aspect of the present invention is a pullout safety apparatus, wherein said pullout safety apparatus is an assembly that couples to the hitch receiver and wherein power is provided by a trailer wiring coupler.

A forty-fourth aspect of the present invention is an assembly process of potting at least one LED to improve reliability.

A forty-fifth aspect of the present invention is an assembly process of molding in at least one LED.

A forty-sixth aspect of the present invention is a pull out step.

A forty-seventh aspect of the present invention is a pull out step, wherein said pullout step is stored within a tailgate.

A forty-eighth aspect of the present invention is a pull out step, wherein said pullout step is stored within a tailgate and pulls out from the top edge of the tailgate.

A forty-ninth aspect of the present invention is a pull out step, wherein said pullout step is stored within a tailgate, wherein said pullout step further comprising a taillight.

A fiftieth aspect of the present invention is a pull out step, wherein said pull out step comprising a hinged section.

A fifty-first aspect of the present invention is a pull out step, wherein said pull out step comprising a hinged section and a locking mechanism, wherein said locking mechanism secures said pull out step in a vertical orientation.

A fifty-second aspect of the present invention is a tailgate taillight comprising artwork.

A fifty-third aspect of the present invention is a tailgate taillight comprising a logo, such as the manufacturer logo.

A fifty-fourth aspect of the present invention is a pull out extension, wherein said pull out extension pulls out from the center of the top edge of a vehicle tailgate to provide support for longer objects.

A fifty-fifth aspect of the present invention is a pull out extension, wherein said pull out extension pulls out from the center of the top edge of a vehicle tailgate to provide support for longer objects, incorporating a taillight.

A fifty-sixth aspect of the present invention is an inclusion of a lock to maintain a removable safety light within a receptacle, the receptacle being integrated within the upper section of the tailgate.

A fifty-seventh aspect of the present invention comprises a telescoping frame to extend the light position to a location proximate a distal end of an object projecting from a bed of the pickup truck.

It is recognized that the pullout apparatus can be utilized on any type of vehicle. Further, the pullout apparatus can be incorporated into the factory taillight, inside wall of a pickup truck bed, and the like.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
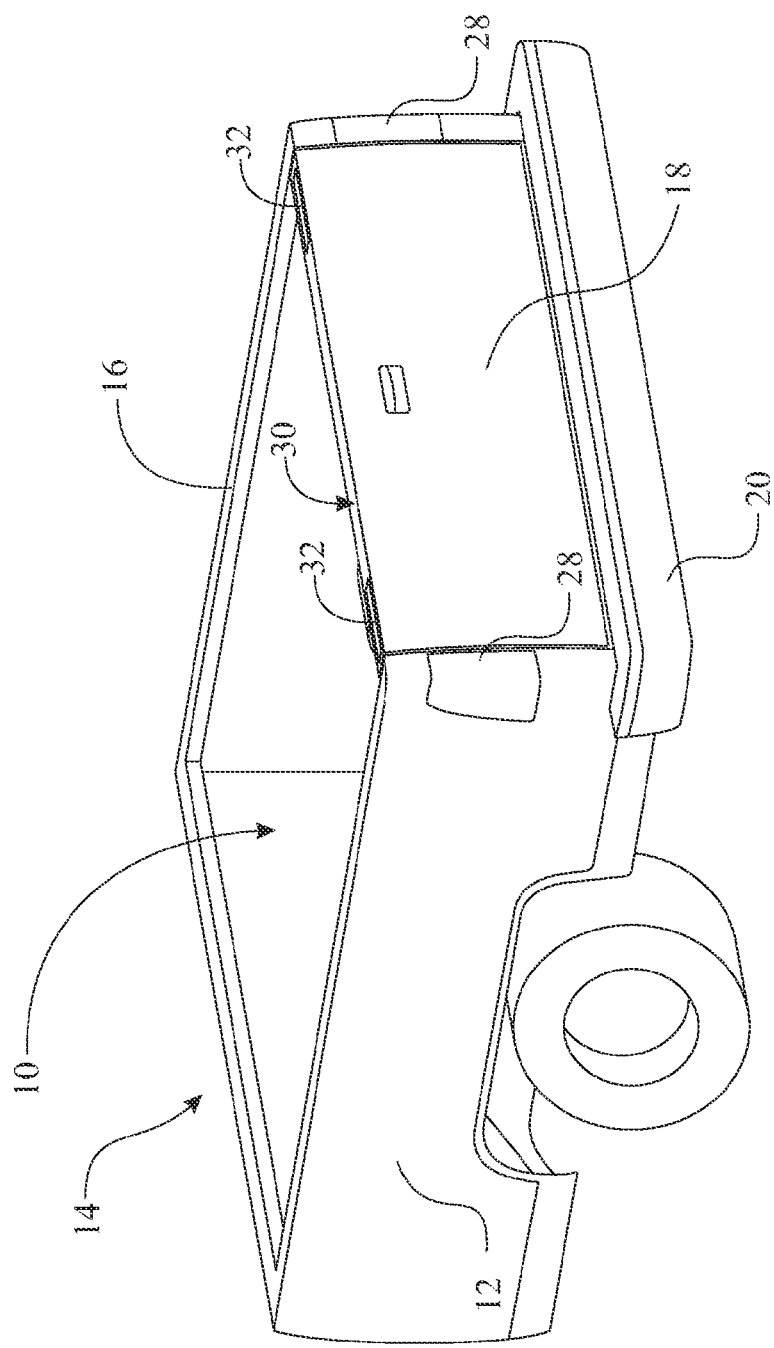
FIG. 1 is an isometric view of a pickup truck bed illustrating the present invention in a first embodiment with the tailgate in a vertical position.

FIG. 1 is an isometric view of a Pickup truck bed comprising a vehicle storage area 10. The vehicle storage area 10 comprises a contained storage area boundary that is created by two storage area sidewalls 12, a storage area front wall 14, and a vehicle tailgate 18. The vehicle tailgate 18 is shown in a vertical or secured position. A bed rim 16 surrounds the upper edge of the vehicle storage area 10. A tailgate top surface 30 completes the upper perimeter of said vehicle storage area 10. The view further illustrates standard taillight (s) 28. The view further illustrates a rear bumper 20 that is commonly considered a standard component of a pickup truck or similar vehicle. Alternatively, a rear valance can replace the rear bumper 20. A pair of tailgate safety light(s) 32 is installed inside said tailgate top surface 30 in accordance with a first embodiment of the present invention. Said tailgate safety light(s) 32 are not illuminated when said vehicle tailgate 18 is in the vertical or closed position, as shown. It is recognized that although a pair of tailgate safety light(s) 32 are the preferred embodiment of the present invention, the number or placement of said tailgate safety light(s) 32 should not circumvent the spirit and intent of the present invention.

Figure 2:
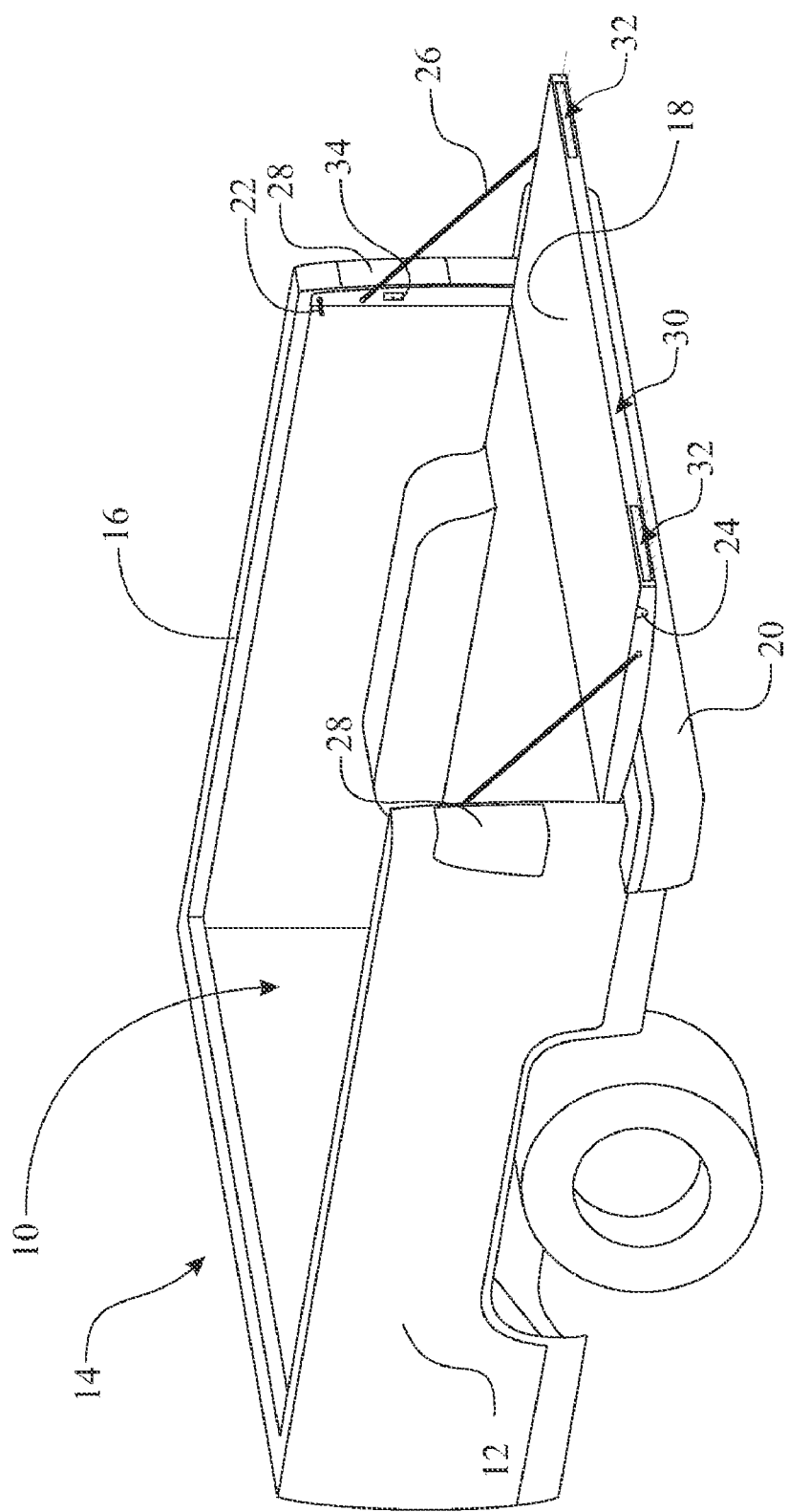
FIG. 2 is an isometric view of a pickup truck bed illustrating the present invention in the first embodiment with the tailgate in a horizontal position.

FIG. 2 is an isometric view of the vehicle storage area 10 illustrating the present invention in an "in-use" orientation, wherein said vehicle tailgate 18 is rotated into a horizontal or lowered position. The vehicle tailgate 18 is hinged such that said vehicle tailgate 18 can rotate into said horizontal position. A tailgate latch pin 22 used in conjunction with a tailgate latch 24 may be (or is) incorporated in said vehicle tailgate 18 to secure the vehicle tailgate 18 in the vertical position. A tailgate support cable 26 is coupled between an inner edge of said external sidewall 12 and said vehicle tailgate 18 as a means to aid in supporting said vehicle tailgate 18 in said horizontal position. The vehicle tailgate 18 shown in the horizontal or lowered position provides the user with an additional platform for holding objects, generally being used in the lowered position when said cargo is longer than the inside fore-aft dimension of said vehicle storage area 10. This is a common practice for pickup truck owners. The problem is that when said vehicle tailgate 18 is in said lowered position; it presents a hazard to vehicles around it. The bumper is no longer the first point of contact for an accident. Drivers tend to not pay as much attention to the tailgate, failing to recognize that it is 2.5-3' closer than normal. In some applications, said lowered vehicle tailgate 18 can in fact obscure the intent of normal warning signal protocols. The present invention addresses the concern and potential safety issue, as when said vehicle tailgate 18 is in the horizontal position, said tailgate safety light(s) 32 are illuminated such to provide a warning to other drivers during all lighting conditions (daytime or nighttime). A vehicle tailgate safety system (present invention) is activated by the inclusion of a tailgate safety light sensor 34 which identifies when said vehicle tailgate 18 in said horizontal position. Said tailgate safety light(s) 32 are illuminated when said tailgate safety light sensor 34 indicates when said vehicle tailgate 18 is lowered into said horizontal position. It is desire-able that said tailgate safety light(s) 32 are illuminated when both the said tailgate safety light sensor 34 indicates such as well as at least one of a parking light is turned on and an ignition switch is turned on. This provides a safety feature when said vehicle tailgate 18 is lowered and the vehicle is either parked or in motion. Additionally, the combination of requirements to activate said tailgate safety light(s) 32 performs the function of simplifying and ensuring the use of the present invention.

Figure 3:
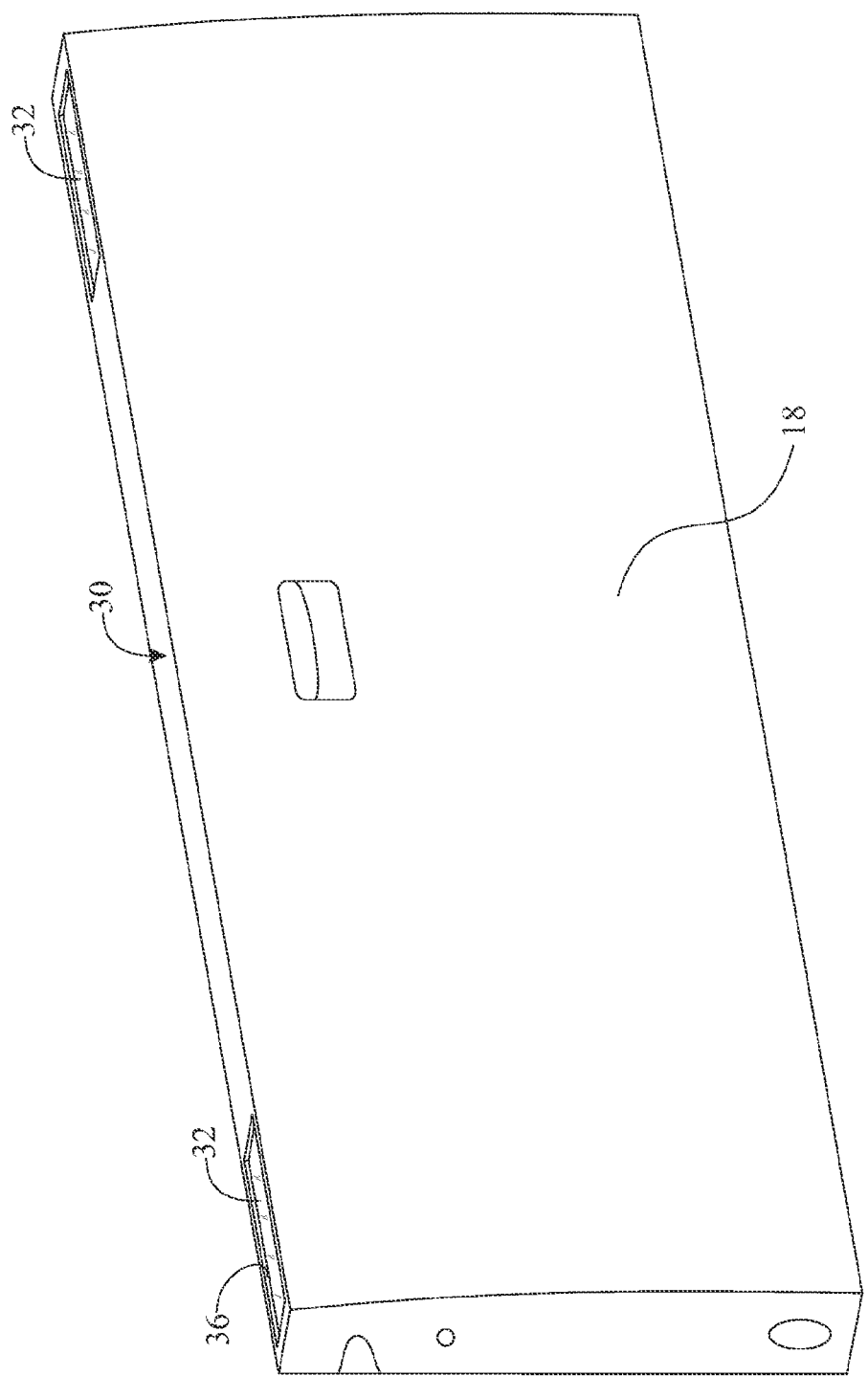
FIG. 3 is an isometric view of the tailgate comprising the first embodiment of the present invention in more detail.

FIG. 3 is an isometric view illustrating additional details of the present invention. The illustration presents a pair of tailgate safety light(s) 32, wherein said tailgate safety light(s) 32 are positioned in a tailgate safety light recess 36 located in said tailgate top surface 30. Said tailgate safety light recess 36 provides some protection to said tailgate safety light(s) 32, as it is commonplace to rest object along said tailgate top surface 30. Alternately (or in conjunction with), a protective lens can be incorporated into said tailgate safety light(s) 32 assembly.

Figure 4:
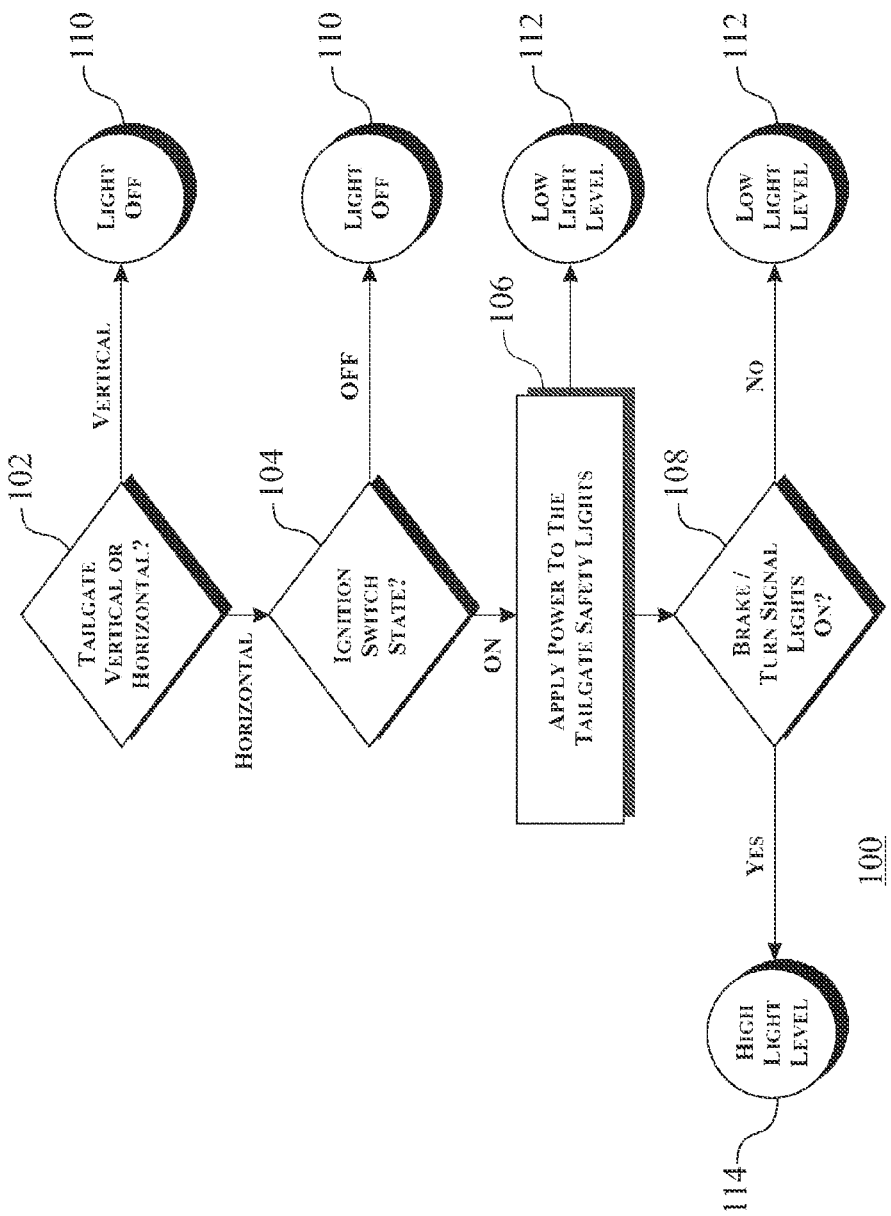
FIG. 4 is flow diagram presenting the functionality of the present invention.

FIG. 4 is a flow diagram presenting a method in accordance with the present invention. A tailgate safety light operational flow diagram 100 is presented. Said tailgate safety light operational flow diagram 100 initiates with said apparatus incorporated into a pickup truck. Said safety light system is preferably activated upon two conditions: (1) said vehicle tailgate 18 is placed in said horizontal position and (2) the user is using the vehicle. Once installed, in accordance with said first condition: said safety light system monitors the orientation of said vehicle tailgate 18 in accordance with a tailgate position decision step 102. Said tailgate position decision step 102 determines whether said vehicle tailgate 18 is in a vertical (closed) or horizontal (open) position as presented in the previous figures. Such monitoring can be accomplished via any known methods of monitoring a position of a door-like object, such as a switch, a proximity sensor, a tilt sensor, a mercury switch, a weighted swivel switch, and the like. In accordance with said second condition: said safety light system monitors the state of the ignition system in accordance with an ignition switch state decision step 104. Said ignition switch state decision step 104 determines if the ignition switch is turned off or on. This could simply be utilizing the ignition switch to as a switch that applies power (completes a circuit) to said tailgate safety light(s) 32. Other means can be utilised, any means known by those skilled in the art, such as relays, and the like. If either said tailgate position decision step 102 is determined to be closed/vertical or ignition switch state decision step 104 determines said ignition is in an "OFF" state, the method maintains said tailgate safety light(s) 32 in an off state in accordance with a tailgate safety light off step 110. Upon said tailgate position decision step 102 being determined to be opened/horizontal and ignition switch state decision step 104 determines said ignition being in an "ON" state, said method applies power to said tailgate safety light(s) 32, illuminating them in accordance with an application of power step 106 to said tailgate safety light(s) 32. Said application of power step 106 places tailgate safety light(s) 32 in a low (normal) intensity level state in accordance with a low-level illumination state step 112. Said tailgate safety light(s) 32 can optionally further comprise two levels of illumination, a low level and a high level. This, two-level lighting, allows for utilising said tailgate safety light(s) 32 to indicate braking and/or turning. When such optional feature is incorporated, said method further comprising a high intensity requirement-monitoring step 108. Said high intensity requirement monitoring step 108 is accomplished by monitoring the state of at least one of application of pressure to the braking system and activating a turn signal indicating circuit. When either of said application of pressure to the braking system or activating a turn signal indicating circuit are determined ("YES"), said tailgate safety light(s) 32 are placed in a high intensity level state in accordance with a high level illumination state step 114. Additionally, when said turn signal indicating circuit is activated, the respective (left or right) tailgate safety light(s) 32 can flash between low and high levels. When both of said application of pressure to the braking system and activating a turn signal indicating circuit are determined ("NO"), said tailgate safety light(s) 32 continue in said low (normal) intensity level state in accordance with said low level illumination state step 112.

Figure 5:
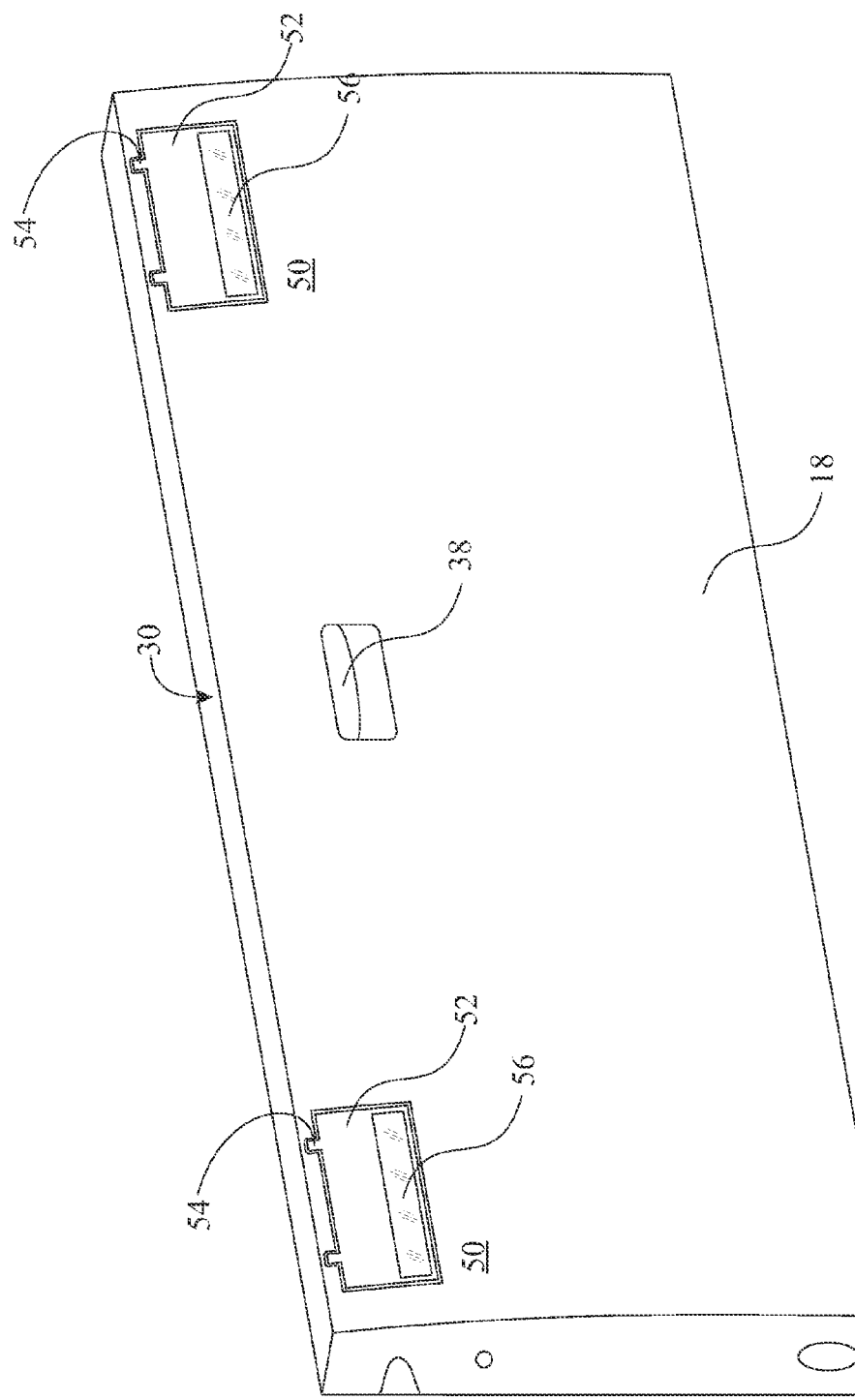
FIG. 5 is an isometric view of the tailgate comprising a second embodiment of the present invention with the tailgate in a vertical position.

FIG. 5 is an isometric view illustrating an alternate embodiment of the present invention. Said alternate embodiment presents a rotating tailgate safety light assembly 50 wherein said rotating tailgate safety light assembly 50 is integrated into a sheet metal skin of said vehicle tailgate 18. The illustration is for presentation purposes and it is recognized that the details and actual reduction to practice may differ depending upon design. The preferred design integrates said rotating tailgate safety light assembly 50 into said vehicle tailgate 18 in an aesthetically pleasing manner. One such design would combine the appearance of said rotating tailgate safety light assembly 50 and said standard taillight(s) 28, such that the two appear fluid in design. Said rotating tailgate safety light assembly 50 comprising a rotating tailgate safety light frame 52 utilized to contain a rotating tailgate safety light 56. Said rotating tailgate safety light assembly 50 rotates via a rotating tailgate safety light hinge 54 as illustrated in FIG. 5 herein. Said rotating tailgate safety light assembly 50 can be optionally secured/released in conjunction with an operation of said tailgate handle 38/latching mechanism.

Figure 6:
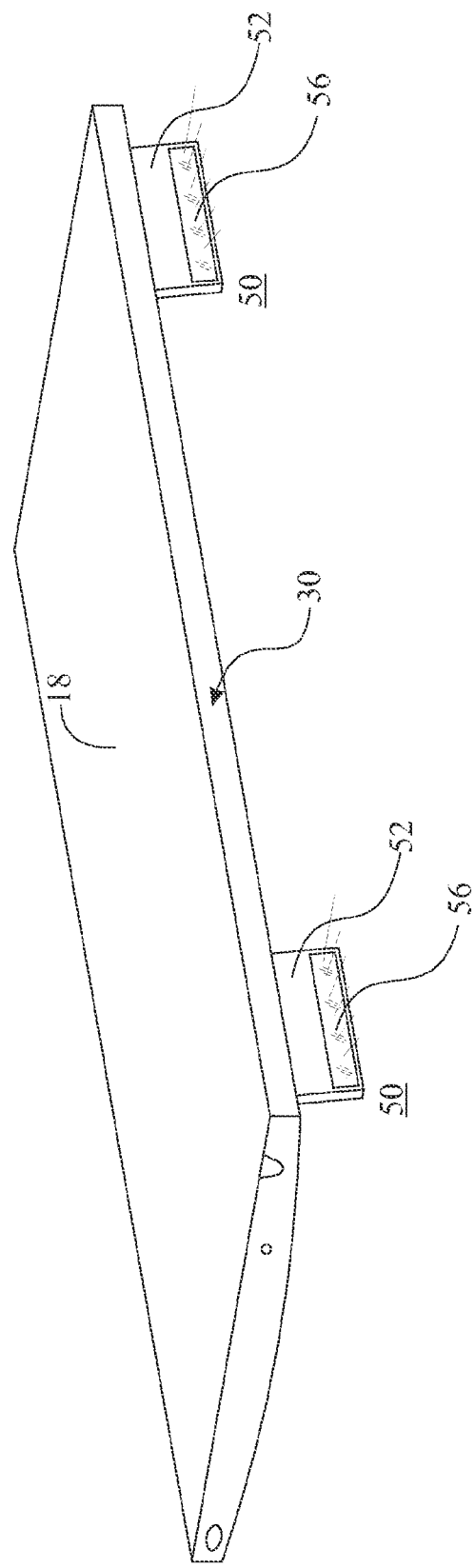
FIG. 6 is an isometric view of the tailgate comprising the second embodiment of the present invention with the tailgate in a horizontal position.

FIG. 6 is an isometric view illustrating an alternate embodiment of the present invention, illustrating when said vehicle tailgate 18 is in said horizontal position. When said vehicle tailgate 18 is placed in said horizontal position, said rotating tailgate safety light assembly 50 rotates from a flush position to one that is generally perpendicular to said vehicle tailgate 18 or in a generally vertical position, as illustrated. This embodiment differs from the previously disclosed embodiment in that it further provides a vertical distance between said tailgate top surface 30 and said rotating tailgate safety light 56. This allows for any material that might cover said tailgate top surface 30. Alternately, this embodiment is of a higher cost and might not be as aesthetically desire-able by the consumer. It can be recognized that said rotating tailgate While said safety light hinge 54 is clearly illustrated, it is recognized that said rotating tailgate safety light hinge 54 can be hidden, such as one similar to an automotive door hinge. It can be recognized that a switch may be utilized in conjunction with said rotating tailgate safety light assembly 50 replacing said tailgate safety light sensor 34.

Figure 7:
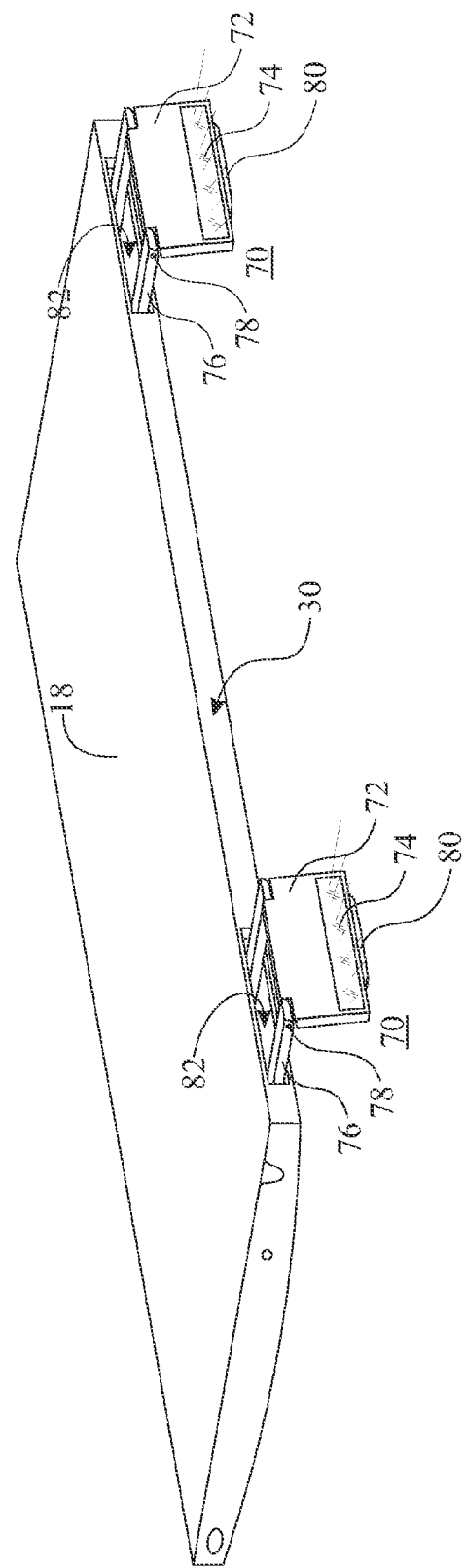
FIG. 7 is an isometric view of the tailgate comprising a third embodiment of the present invention with the tailgate in a horizontal position.

FIG. 7 is an isometric view illustrating another embodiment of the present invention. Said embodiment presents a slide-able tailgate safety light assembly 70 wherein said slide-able tailgate safety light assembly 70 is integrated into said tailgate top surface 30 utilizing a slide-able tailgate safety light pocket 82 for storing/operating said slide-able tailgate safety light assembly 70. Said slide-able tailgate safety light assembly 70 comprising a slide-able tailgate safety light frame 72, which contains a slide-able tailgate safety light 74. Said slide-able tailgate safety light frame 72 slides out of said a slide-able tailgate safety light pocket 82 via a slide-able tailgate safety light slide mechanism 76 and rotates into a functional orientation via a slide-able tailgate safety light hinge 78. Said slide-able tailgate safety light assembly 70 optionally comprising a slide-able tailgate safety light handle 80 for aiding the user in the process of sliding out and returning of said slide-able tailgate safety light frame 72 into said slide-able tailgate safety light pocket 82. This embodiment provides an aesthetically pleasing design. This embodiment provides protection to said slide-able tailgate safety light 74. Alternatively, this embodiment requires additional effort of the user to properly position said slide-able tailgate safety light assembly 70 when desired for use. It can be recognized that a switch may be utilised in conjunction with said slide-able tailgate safety light assembly 70 replacing said tailgate safety light sensor 34.

Figure 8:
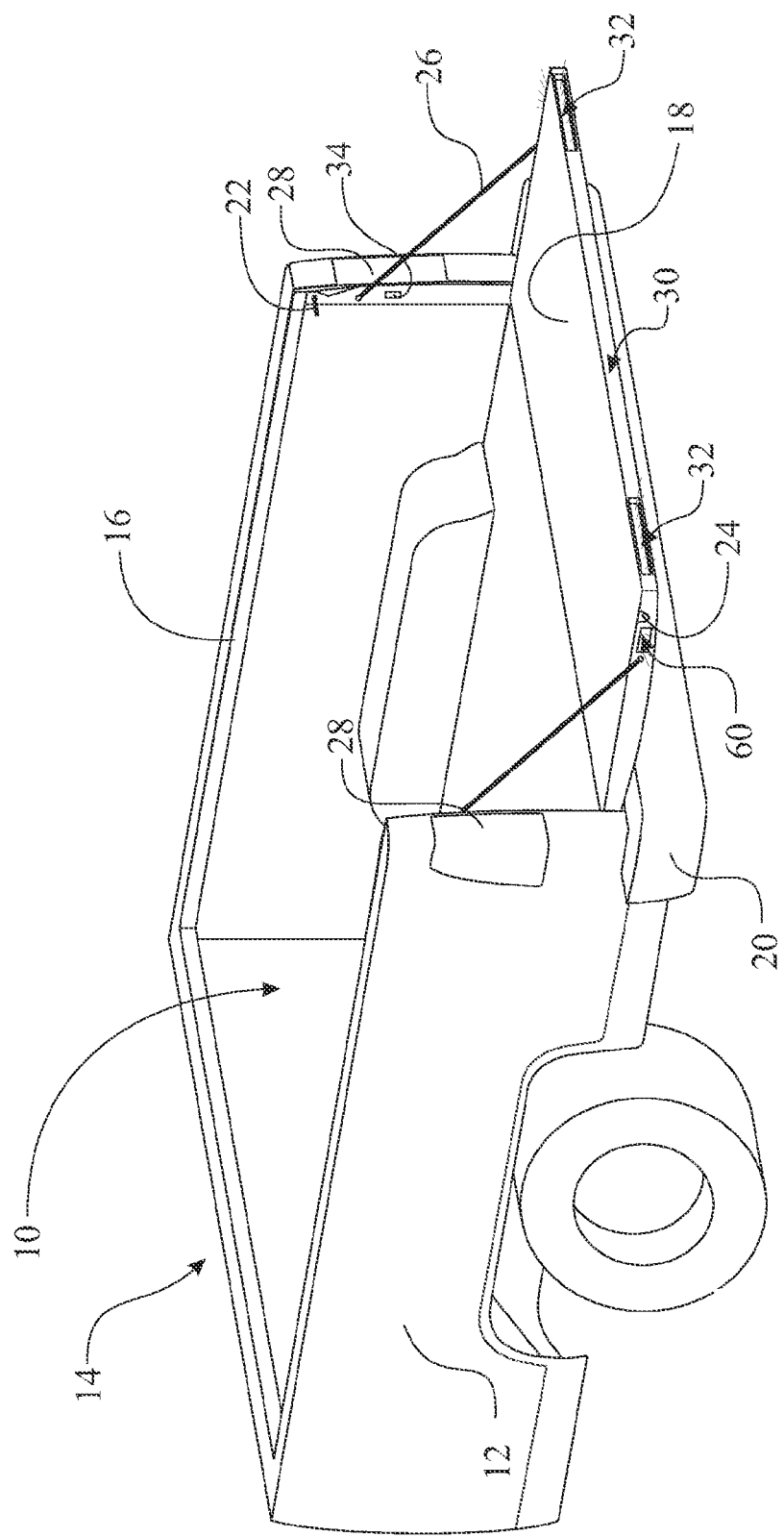
FIG. 8 is an isometric view of the tailgate comprising tailgate side safety light.

FIG. 8 is an isometric view containing the elements of FIG. 2 and further including tailgate side safety light(s) 60. Said tailgate side safety light(s) 60 are positioned on the side of said vehicle tailgate 18 providing additional visibility that the tailgate is in a lowered position to the other drivers who may be in a position traveling obliquely to the direction of the subject vehicle with said vehicle tailgate 18. Said tailgate safety light(s) 32 provide visibility from the rear of the vehicle. When said tailgate safety light(s) 32 are recessed, said tailgate safety light(s) 32 fail to adequately notify drivers oblique to the vehicle that the tailgate is in a lowered position. Said tailgate side safety light(s) 60 accounts for this scenario, increasing the awareness of drivers other than those directly facing the rear of said vehicle to the tailgate position.

Figure 9:
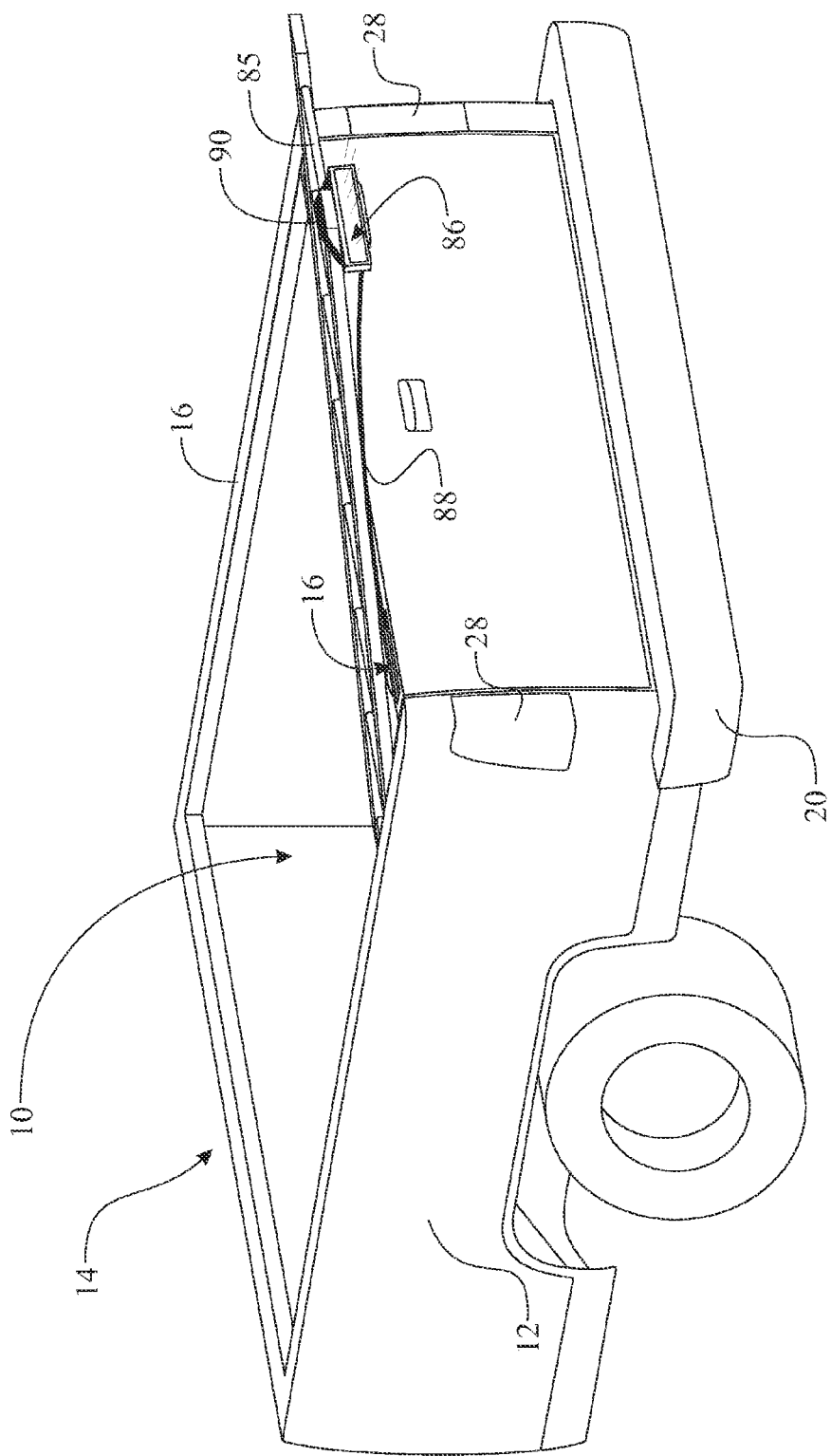
FIG. 9 is an isometric view of a removable tailgate safety light assembly for use in conjunction with objects that extend beyond the rear edge of the pickup truck bed.

FIG. 9 is an isometric view illustrating an optional embodiment of the present invention. Said optional embodiment expands the safety features of said tailgate safety light(s) 32, wherein said tailgate safety light(s) 32 are removable allowing said tailgate safety light(s) 32 to be used as a portable tailgate safety light 86. Said portable tailgate safety light 86 would be coupled via a portable tailgate safety light securing mechanism 90 to an overhanging object 85 by the user. Said portable tailgate safety light securing mechanism 90 can be of any known design and method, such as elastic material, Velcro®, magnets, ties, nails, screws, adhesive, and the like. It would be desirable that said portable tailgate safety light securing mechanism 90 is stored with said portable tailgate safety light 86. Said portable tailgate safety light 86 can be powered via a retractable power cable 88 or rechargeable battery. Wherein said illustration presents the light direction being only rearward, it would be feasible that said portable tailgate safety light 86 would be designed such to provide light to multiple directions. Said portable tailgate safety light 86 provides a means for replacing the red material tied to the end of an object. Said portable tailgate safety light 86 ensures that the user has the signaling material available as needed. Additionally, an illuminated object draws more attention than a non-illuminated object.

Figure 10:
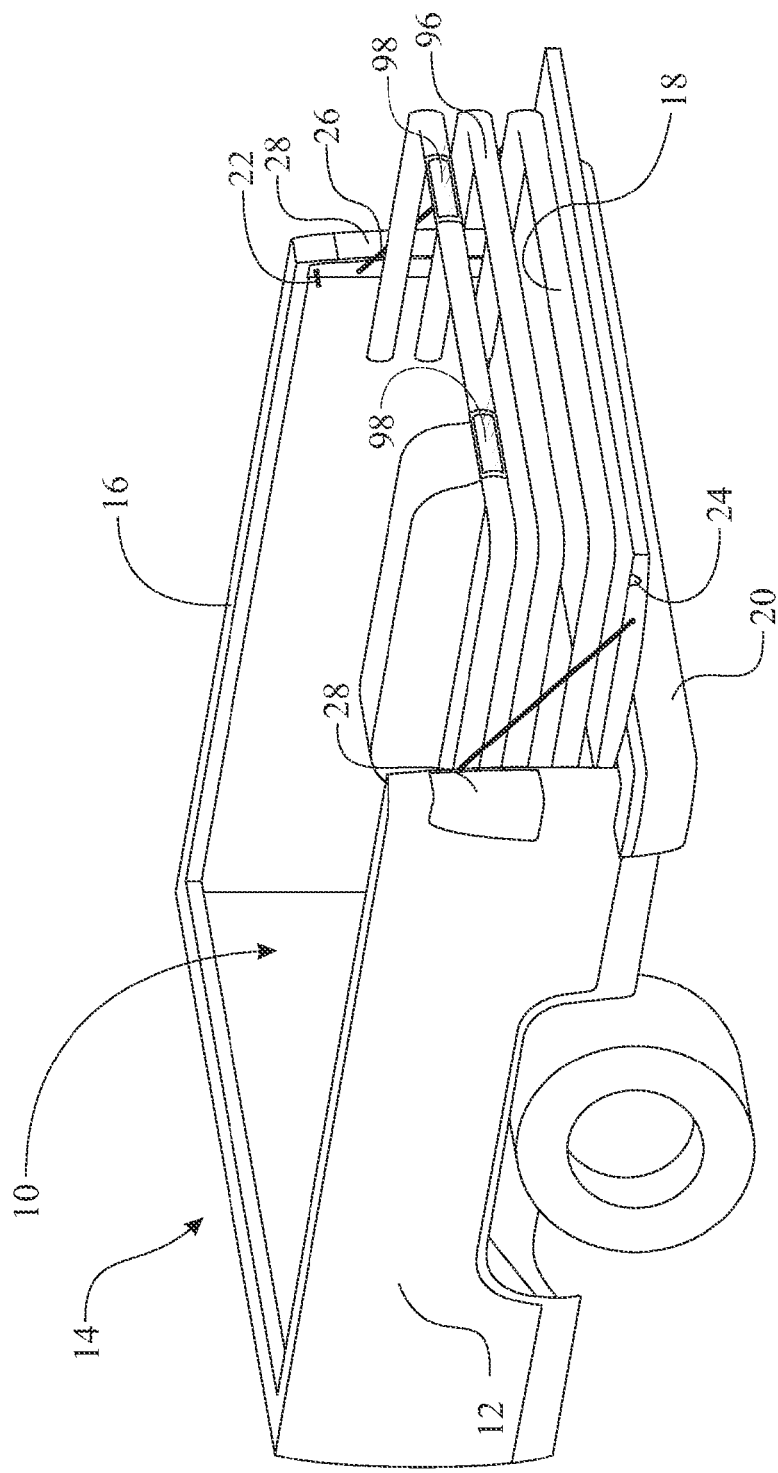
FIG. 10 is an isometric view of one example of a tailgate bed extending apparatus incorporating a tailgate safety light assembly.

FIG. 10 illustrates an isometric view of yet another embodiment of the present invention, alternately integrating said tailgate safety light(s) 32 as tailgate extension assembly safety light(s) 98 into a tailgate extension assembly 96. Said tailgate extension assembly safety light(s) 98 would comprise the same features as said tailgate safety light(s) 32 described herein. Said tailgate extension assembly 96 could be the "C" shaped assembly as shown or any other of the many known assemblies for accomplishing the same means.

Figure 11:
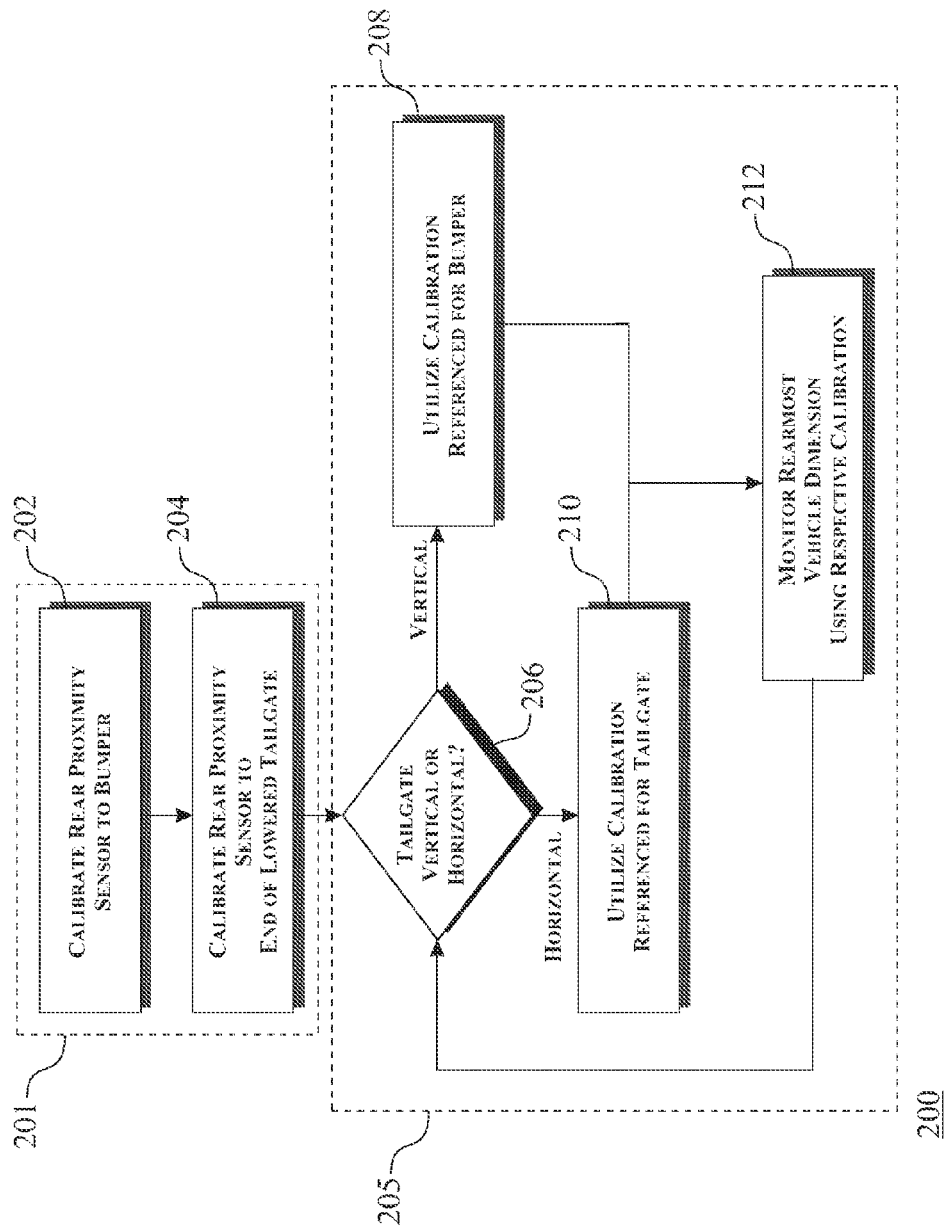
FIG. 11 is a flow diagram illustrating the steps of distance compensating rear proximity sensors when the rearmost dimension of a vehicle changes, such as when a tailgate is lowered.

FIG. 11 is a flow diagram illustrating an additional safety feature when a vehicle tailgate 18 is placed in a horizontal orientation. Said figure presents the steps of a rear proximity distance-compensating flow diagram 200. Said rear proximity distance-compensating flow diagram 200 is configured in accordance with a configuration subsection 201. Said configuration subsection 201 comprising a rear bumper calibration step 202 and a lowered tailgate calibration step 204. These two steps can be accomplished in any known manner and in an order respective to the method reduced to practice. Said configuration subsection 201 would only be required upon initial installation or a calibration reset scenario of the rear proximity sensor system. Upon completion of said configuration subsection 201, the multiple calibration proximity sensing method progresses into a general operation subsection 205. Said general operation subsection 205 comprising the steps in which the method would function during its day-to-day practice. Said general operation subsection 205 monitors the orientation of said vehicle tailgate 18. A tailgate orientation decision step 206 utilizes a tailgate orientation sensor (see 236 of FIG. 13) to determine the orientation of said vehicle tailgate 18. When determined that said vehicle tailgate 18 is in a vertical (closed) position, the multiple calibration proximity sensing method utilizes a calibration referenced to the bumper in accordance with a bumper referenced calibration utilization step 208. When determined that said vehicle tailgate 18 is in a horizontal (open) position, the multiple calibration proximity sensing method utilizes a calibration referenced to said tailgate top surface 30 in accordance with a tailgate referenced calibration utilization step 210. Once the system has the calibration respective to the orientation of said tailgate assembly, said multiple calibration proximity sensing method monitors the distance from an object behind the vehicle and what is determined to be the rearmost position of the vehicle in accordance with a rear proximity distance monitoring step 212. Said rear proximity distance monitoring step 212 is repeated until there is a change in the result of said tailgate orientation decision step 206. Said rear proximity distance-compensating flow diagram 200 can be applied to any hinged or sliding object that changes the rearmost position of a vehicle. The implementation of said multiple calibration proximity sensing method can be implemented by those skilled in the art using any known tailgate orientation sensing mechanism, software for compensating for the calibration, and known proximity sensing technology.

Figure 12:
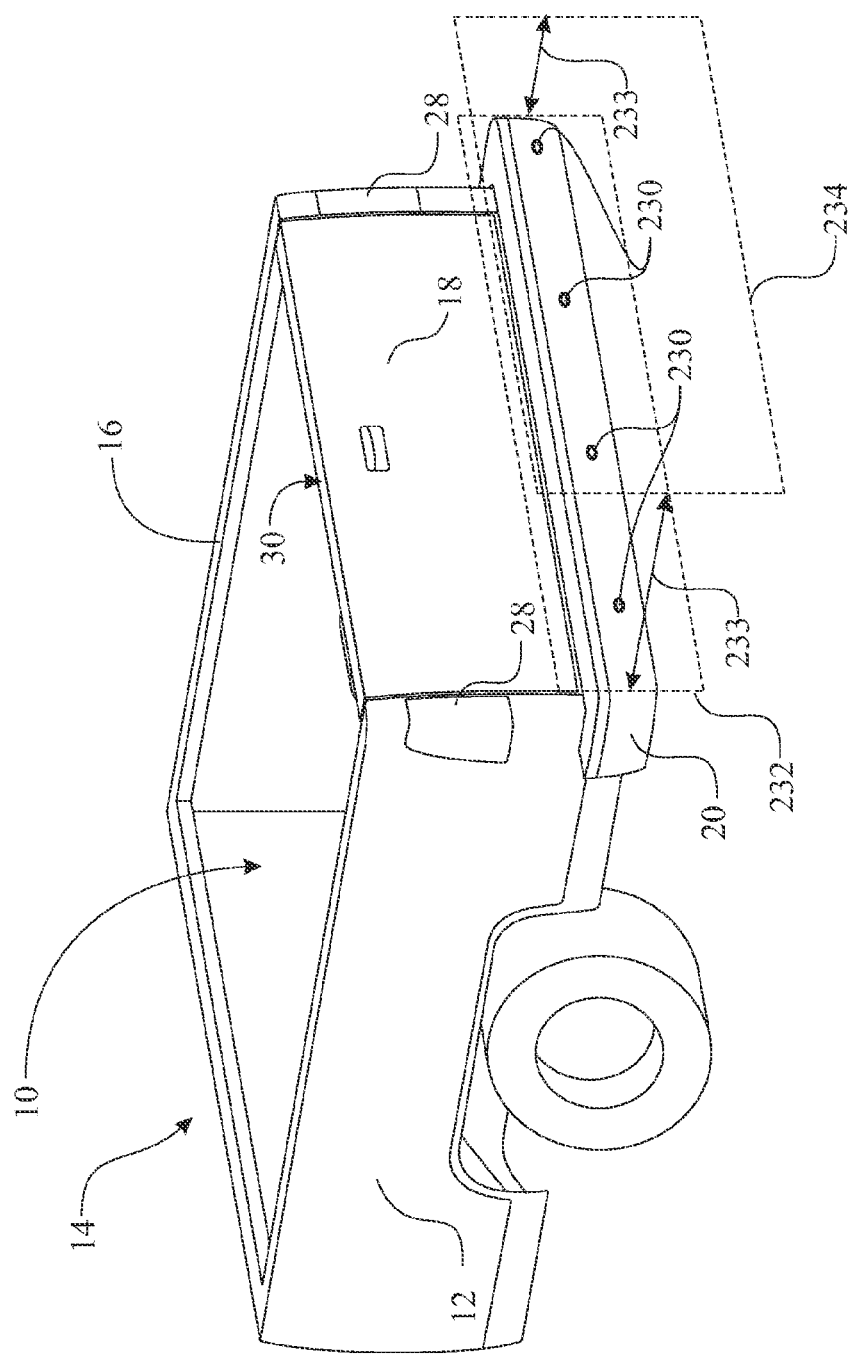
FIG. 12 is an isometric view illustrating a distance compensating rear proximity sensor system, wherein the tailgate is in a closed position.
Figure 13:
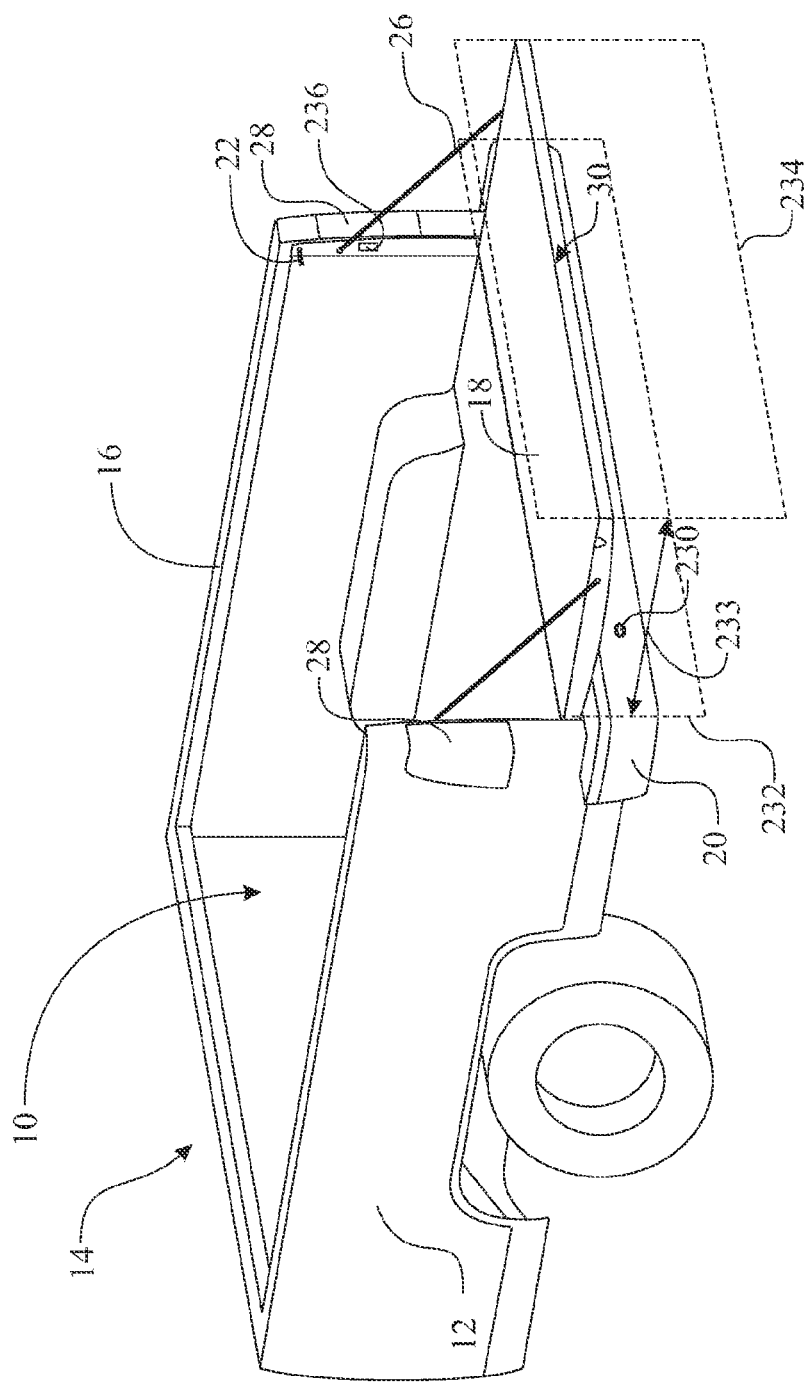
FIG. 13 is an isometric view illustrating a distance compensating rear proximity sensor system, wherein the tailgate is in an open position.

FIGS. 12 and 13 present an isometric view of a multiple calibration proximity sensing apparatus respective to the method presented in FIG. 11. The figure illustrates the resultant of said tailgate orientation decision step 206 being said vehicle tailgate 18 oriented vertically (closed). Said vehicle comprising a plurality of rear proximity sensor(s) 230 incorporated in said rear bumper 20. When said vehicle tailgate 18 is closed, the multiple calibration proximity sensing apparatus is calibrated to use a bumper proximity plane 232 as the rearmost plane of the vehicle. When said vehicle tailgate 18 is open, the multiple calibration proximity sensing apparatus is calibrated to use a tailgate proximity plane 234 as the rearmost plane of the vehicle. The proximity plane change 233 is the distance between said bumper proximity plane 232 and tailgate proximity plane 234. Without said multiple calibration proximity sensing apparatus, the standard rear proximity sensing system would not consider said proximity plane change 233, allowing the user to damage said vehicle tailgate 18. It is further recognized that said plurality of rear proximity sensor(s) 230 cannot be oriented to monitor objects located looking vertically between the vehicle and the ground. This limits the application of said plurality of rear proximity sensor(s) 230. Alternatively, one can deploy heat sensors that will identify objects such as children and animals that might stray under the vehicle.

Alternately, one can place rear proximity sensors along said tailgate top surface 30. One drawback of this alternative is the cost increase. A second drawback is the potential for damage to the rear proximity sensors along said tailgate top surface 30.

Figure 14:
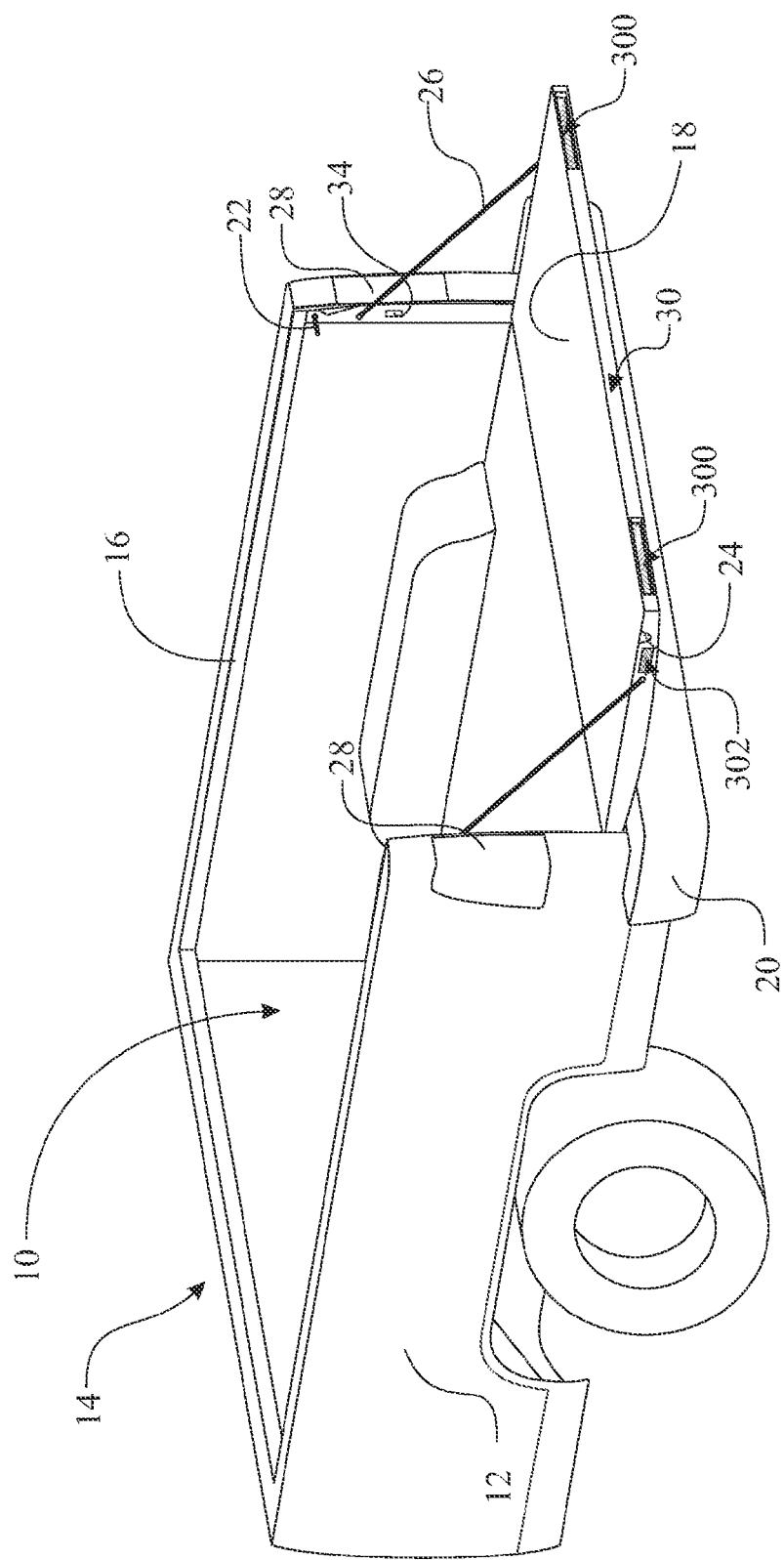
FIG. 14 is an isometric view illustrating an alternate embodiment of the present invention, utilizing reflective material.

FIG. 14 illustrates a isometric view of said Pickup Truck bed, presenting an alternate embodiment of the present invention, wherein said tailgate safety light(s) 32 and optional tailgate side safety light(s) 60 comprise a reflective medium, thus becoming a tailgate safety reflector medium 300 and a tailgate side safety reflector medium 302 respectively. It would be desirable for said tailgate safety reflector medium 300 to be placed in a recess of said tailgate top surface 30 to minimize damage and wear to said reflective medium. Said reflective medium can be of any color, preferably meeting any legal requirements. Such requirements may include a color of red, visible at night from all distances within 600 feet to 100 feet to the rear when directly in front of lawful lower beams of headlamps. The preferred location would be to indicate maximum width of said vehicle tailgate 18. Said tailgate side safety reflector medium 302 would preferably be sized such and positioned on each side of said vehicle tailgate 18, said tailgate side safety reflector medium 302 being red and visible from a distance of at least 500 feet to the side and located at a position proximate said tailgate top surface 30.

Figure 15:
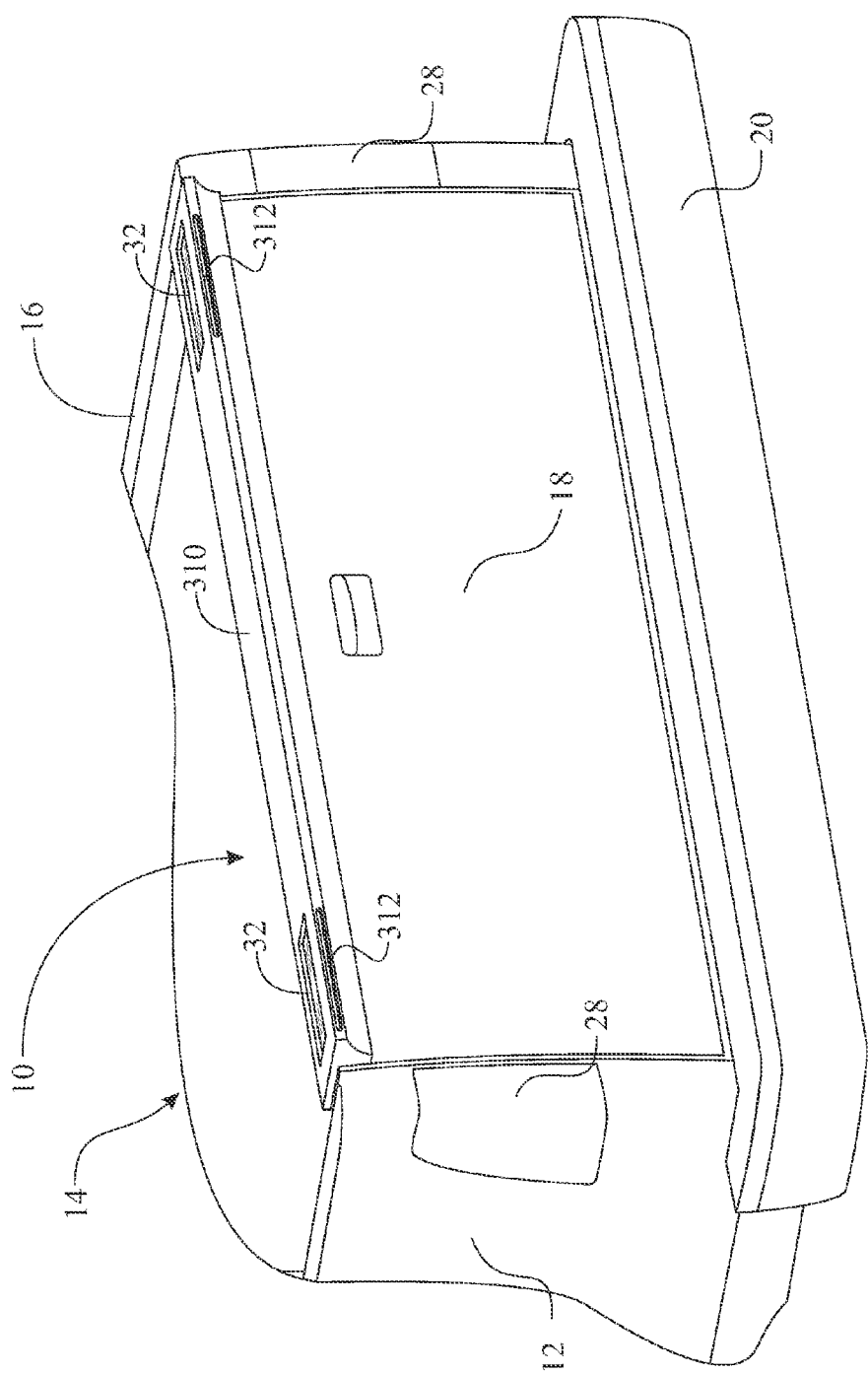
FIG. 15 is an isometric view illustrating another alternate embodiment of the present invention, positioning said safety lights within a tailgate protective cover.

FIG. 15 presents another alternate embodiment of the present invention, wherein said tailgate safety light(s) 32 are assembled into a tailgate protective top cover 310. Additionally, the figure illustrates another aspect of the present invention; presenting a tailgate rearview safety light 312. Said tailgate rearview safety light 312 can be the same illumination source as said tailgate safety light(s) 32, or a different illumination source. The function of said tailgate rearview safety light 312 would be either simple illumination or consistent with said standard taillight(s) 28. It is recognized that although not as desirable, a reflective medium could be used as an alternative to an illumination source. Said tailgate protective top cover 310 can be provided as an OEM assembly or an aftermarket assembly.

Figure 16:
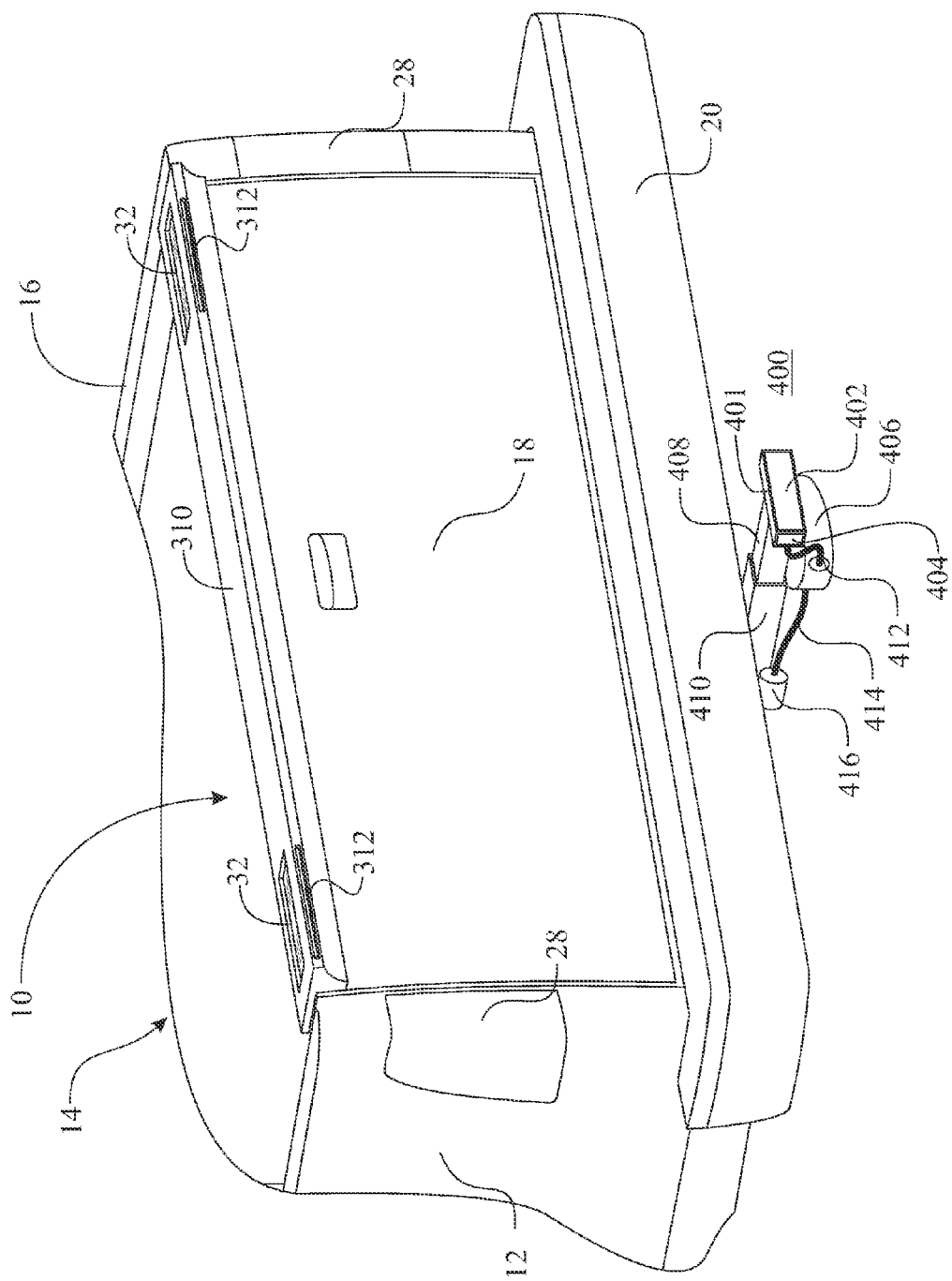
FIG. 16 illustrates an alternate embodiment for said pullout safety light in a stored position.

FIG. 16 presents an isometric view of an alternate embodiment to said portable tailgate safety light 86 of FIG. 9, wherein said alternate embodiment is a removable trailer hitch projection light assembly 400. Said removable trailer hitch projection light assembly 400 comprising a removable light assembly 401. Said removable light assembly 401 comprising an enclosure, which presents a primary angle viewing safety taillight 402 and optional secondary angle viewing safety taillight 404. Power is supplied to said removable light assembly 401 via a removable light power cable 412. Said removable light power cable 412 is retractable and retracts into via a retractable cord mechanism 406. Said removable light assembly 401 and retractable cord mechanism 406 can be assembled to a mounting member 408. Said mounting member 408 is preferably designed to couple to a trailer hitch receptacle 410. Power is supplied to said removable trailer hitch projection light assembly 400 via a power supply cable 414, said power supply cable 414 is preferably designed to electro-mechanically couple with a trailer hitch light control connector 416. This power source configuration provides an illumination sequence to said removable light assembly 401 concurrent with the illumination of said standard taillight(s) 28. This illustration presents said removable trailer hitch projection light assembly 400 in a stored state. In a slightly modified version, the power can be provided to rechargeable batteries, thus eliminating said removable light power cable 412 and said retractable cord mechanism 406. Should it be desirable to provide lighting concurrent with said standard taillight(s) 28, wireless communications can be utilised. Several low power examples include bluetooth, zigbee, and the like. There are pros and cons for each embodiment and the reduction to practice should be that of designer's choice; not limiting the spirit and intent of the present invention.

Figure 17:
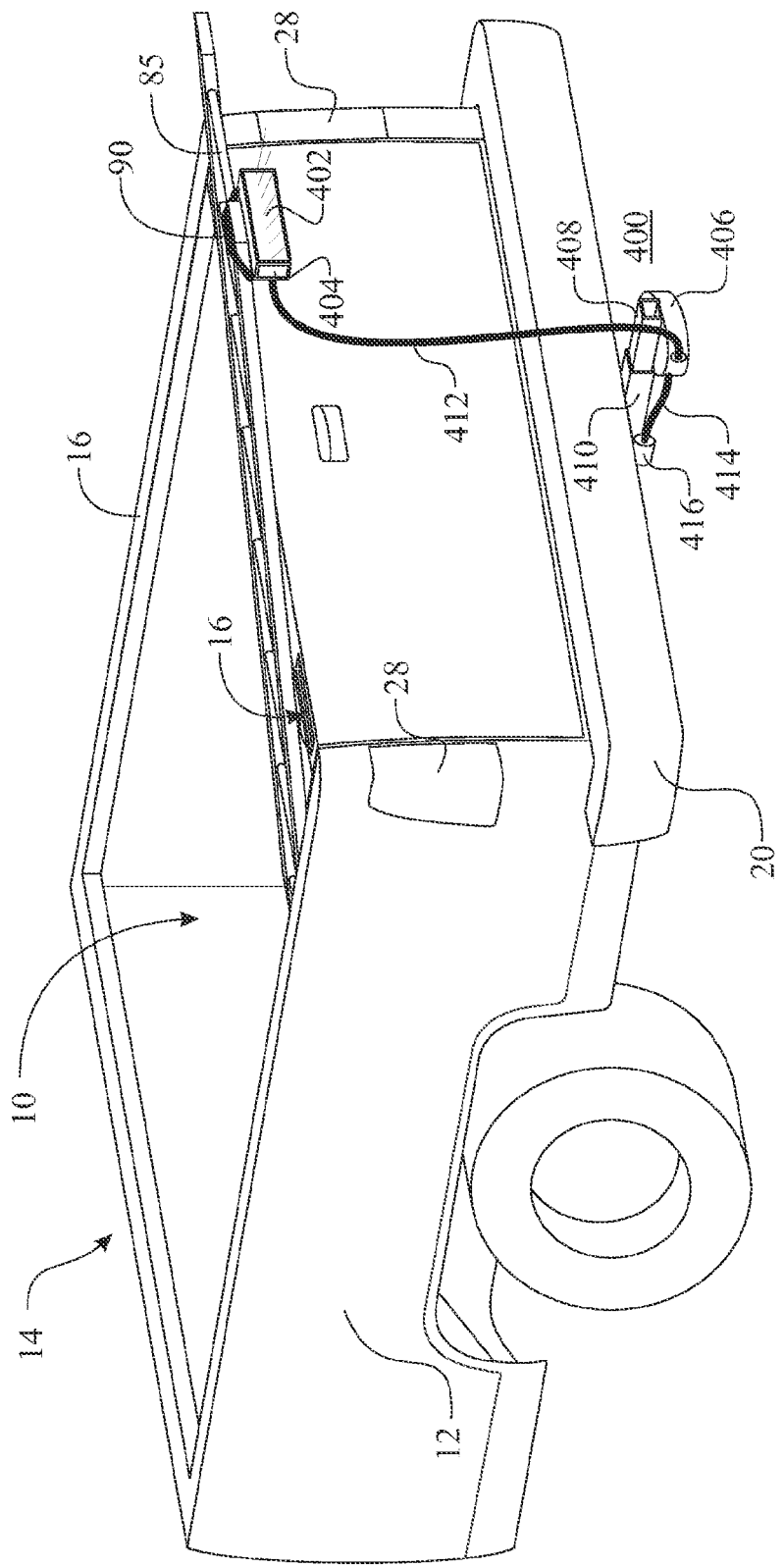
FIG. 17 illustrates an alternate embodiment for said pullout safety light in an in-use position.

FIG. 17 illustrates said removable trailer hitch projection light assembly 400 in an in-use state. Said removable light assembly 401 is coupled to said overhanging object 85 via said portable tailgate safety light securing mechanism 90. It would be desirable wherein said portable tailgate safety light securing mechanism 90 is stored within said mounting member 408 when not in use. There are many designs providing the user with a removable light assembly 401 that can be removably coupled to said mounting member 408.

Figure 18:
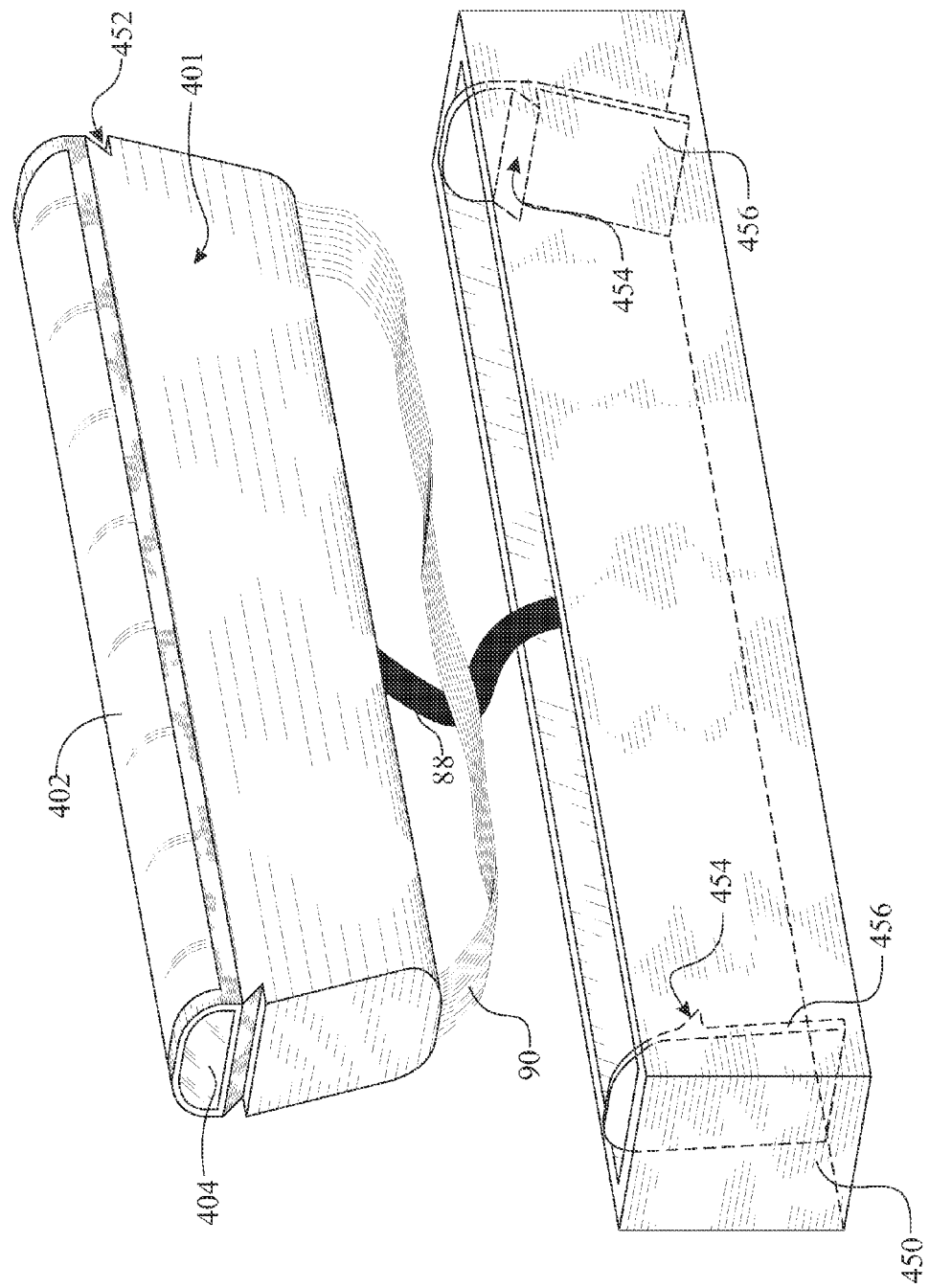
FIG. 18 illustrates a closer view of said pullout safety light providing additional details.

FIG. 18 presents a more detailed illustration of said removable light assembly 401. Said removable light assembly 401 comprising said primary angle viewing safety taillight 402 and said optional secondary angle viewing safety taillight 404. Said primary angle viewing safety taillight 402 would be visible along the length of said removable light assembly 401. Said optional secondary angle viewing safety taillight(s) 404 are positioned on each side of said removable light assembly 401. Said removable light assembly 401 would comprise of at least one light (not shown, but well understood) positioned within the enclosure. One embodiment would comprise a series of LED's assembled to a circuit assembly. The LED's would illuminate and be visible through said primary angle viewing safety taillight 402 as well as said secondary angle viewing safety taillight(s) 404. The color would be consistent with any legal directives. The color can be provided via either a colored lens, colored illumination source, or both. Said removable light assembly 401 can be coupled via a safety light assembly receptacle 450. Said safety light assembly receptacle 450 comprising a safety light assembly storage section 451, wherein said removable light assembly 401 is placed when stored. Said removable light assembly 401 is removably coupled to said safety light assembly receptacle 450 via an interface between a safety light coupling recess 452 and a safety light coupling clip 454. Said safety light coupling clip 454 is integrated with a safety light coupling clip spring 456, wherein said safety light coupling clip 454 can be positioned to secure or release said removable light assembly 401 respective to said safety light assembly receptacle 450. Said safety light assembly receptacle 450 can be coupled to said mounting member 408, integrated into said vehicle tailgate 18, or any other vehicle mounting design. Additionally illustrated is the storage of said retractable power cable 88/removable light power cable 412 and said portable tailgate safety light securing mechanism 90. Said retractable power cable 88/removable light power cable 412 would retract through said safety light assembly receptacle 450. Said portable tailgate safety light securing mechanism 90 would be stored within said safety light assembly storage section 451 of said safety light assembly receptacle 450.

Figure 19:
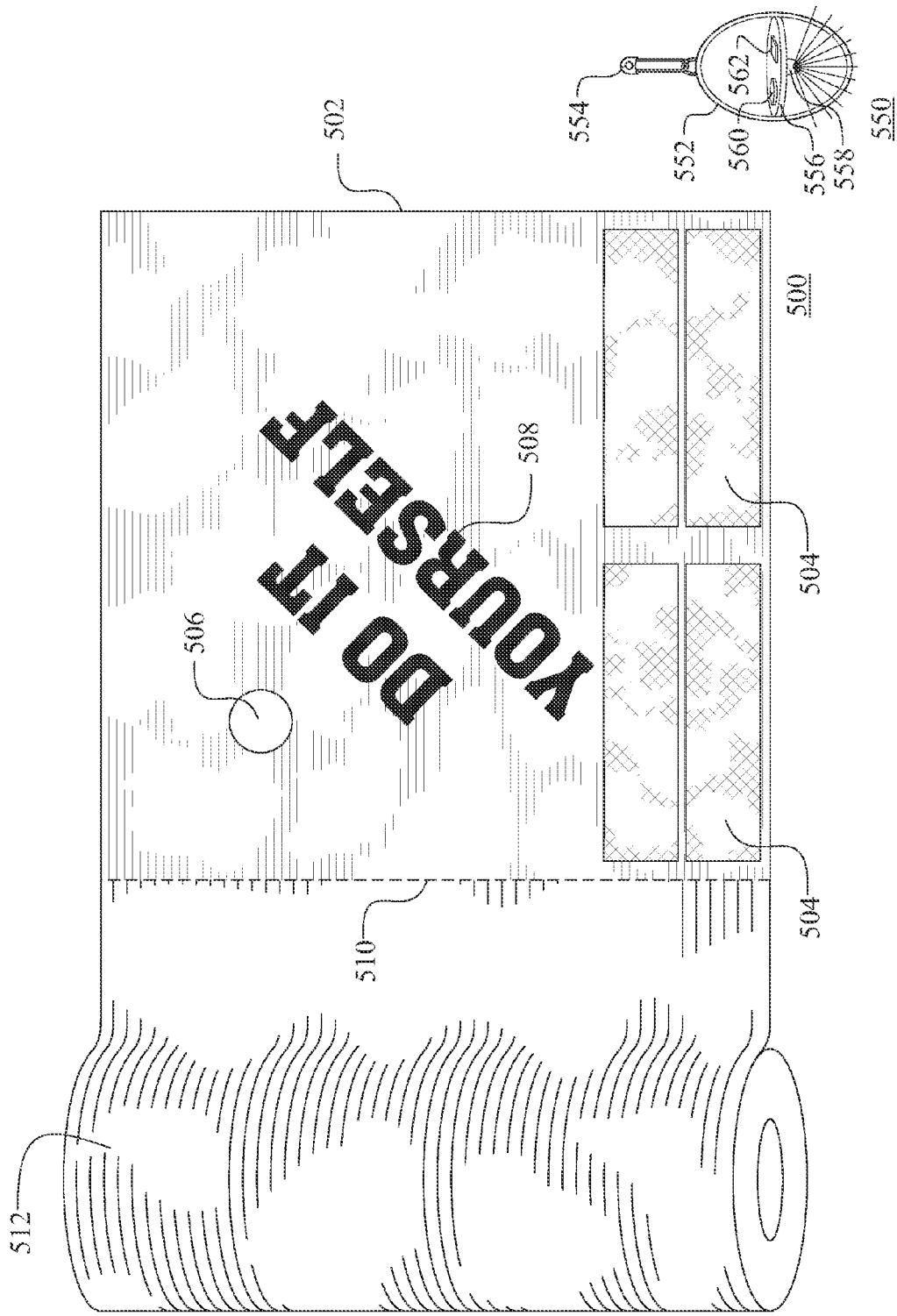
FIG. 19 illustrates a red flag with removable reflector tape sections.

FIG. 19 introduces yet another safety feature for objects projecting from a vehicle. The illustration introduces a projecting object warning flag and reflective material 500, wherein said projecting object warning flag and reflective material 500 comprising a projecting flag material 502. Said projecting flag material 502 is preferably presented off a plurality of projecting object warning flag and reflective material 500 placed in a rolled plurality of warning flags 512. Said projecting flag material 502 can be of any flexible type material, including plastic, nylon, fabric, and the like. Additionally, said projecting flag material 502 can be made reflective. Said projecting object warning flag and reflective material 500 is separated from said rolled plurality of warning flags 512 by the inclusion of perforations 510. Said projecting flag material 502 is of a legally colored material (generally red) for use as a red flag that is tied to an object that is projecting from a vehicle. Said projecting object warning flag and reflective material 500 further comprising a projecting flag securing aperture 506 placed within said projecting flag material 502, wherein said projecting flag securing aperture 506 is provided to assist in securing said projecting object warning flag and reflective material 500 to said projecting object. Said projecting object warning flag and reflective material 500 further comprising at least one removable reflective material 504, preferably four (4) pieces of said removable reflective material 504. This provides sufficient material for the legal requirements of a reflective material on the rear of a projecting object to show the width of said projecting object as well as on each side of said projecting object. Said removable reflective material 504 would preferably be a reflective material with an adhesive backing, wherein said removable reflective material 504 would be removed from said projecting object warning flag and reflective material 500 and adhered to said projecting object. Said projecting flag material 502 would then be secured to said projecting object such as by tying said projecting flag material 502 using said projecting flag securing aperture 506. Alternatively, said projecting object warning flag and reflective material 500 can be coupled to said projecting object include Velcro®, magnets, tie handles, and the like. Said projecting object warning flag and reflective material 500 could optionally include advertisement(s) 508, such as the name/logo of the hardware supply store. It would be more desirable wherein said advertisement(s) 508 are of a color contrasting, reflective material applied to said projecting flag material 502.

An optional warning flag illumination ornament 550 can be provided to the customer, wherein said warning flag illumination ornament 550 comprising a warning flag illumination ornament coupler 554 to couple said warning flag illumination ornament 550 to said projecting object warning flag and reflective material 500. Said warning flag illumination ornament 550 comprising a warning flag illumination ornament enclosure 552. A warning flag illumination ornament circuit assembly 556 comprising a warning flag illumination power source 560, a warning flag illumination controller 562, and a warning flag illumination apparatus 558, collectively providing a portable illumination source is placed within said warning flag illumination ornament enclosure 552. Said warning flag illumination apparatus 558 can be an LED, an incandescent bulb, and the like. The LED is preferred as it is less susceptible to damage by shock and vibration as well as being a lower power drain. To further ensure longevity, the illumination source can be potted or molded into a support material. Said warning flag illumination power source 560 can be activated by storing with a non-conductive material (not shown) positioned in a manner to avoid conductivity between a circuit and a terminal of said warning flag illumination power source 560. To activate said warning flag illumination ornament 550, the user would remove said non-conductive material. Said warning flag illumination ornament 550 can further comprise circuitry to flash said warning flag illumination apparatus 558.

Figure 20:
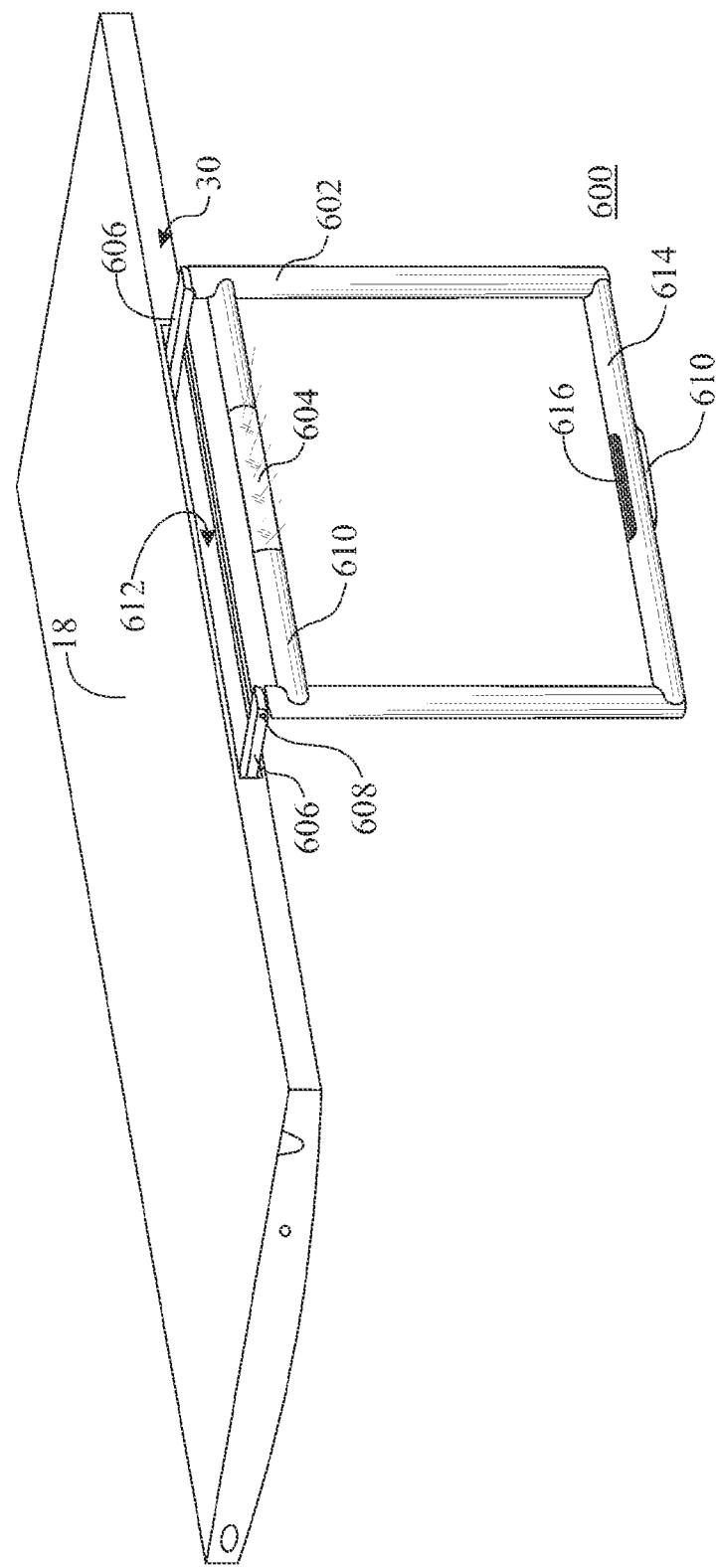
FIG. 20 illustrates a slide-able, pullout tailgate step positioned within the tailgate.

FIG. 20 is an isometric view of a slide-able tailgate step & safety light assembly 600; wherein said slide-able tailgate step & safety light assembly 600 is stored within said vehicle tailgate 18. Said slide-able tailgate step & safety light assembly 600 pulls out of a slide-able tailgate step pocket 612 within the tailgate top surface 30. Said slide-able tailgate step & safety light assembly 600 comprising a number of components. A slide-able tailgate step & safety light frame 602 is coupled to said vehicle tailgate 18 via a slide-able tailgate safety light slide mechanism 606. Said slide-able tailgate step & safety light frame 602 is coupled to said slide-able tailgate safety light slide mechanism 606 via a slide-able tailgate safety light hinge 608, preferably incorporating a locking mechanism (not shown) wherein said locking mechanism secures said slide-able tailgate step & safety light frame 602 in a substantially vertical orientation. Said slide-able tailgate step & safety light frame 602 comprising a slide-able tailgate step 614, wherein said slide-able tailgate step 614 provides a step to aid a person in climbing into the bed of a truck. To ensure safety, a slide-able tailgate step grip section 616 can be coupled to said slide-able tailgate step 614. Said slide-able tailgate step grip section 616 can be a grip adhesive strip applied onto said slide-able tailgate step 614, a secondary member mechanically coupled to said slide-able tailgate step 614, simply a texturing applied to said slide-able tailgate step 614, and the like. A slide-able tailgate step handle 610 can optionally be included to assist the user in pulling said slide-able tailgate step & safety light assembly 600 out of a slide-able tailgate step pocket 612.

Figure 21:
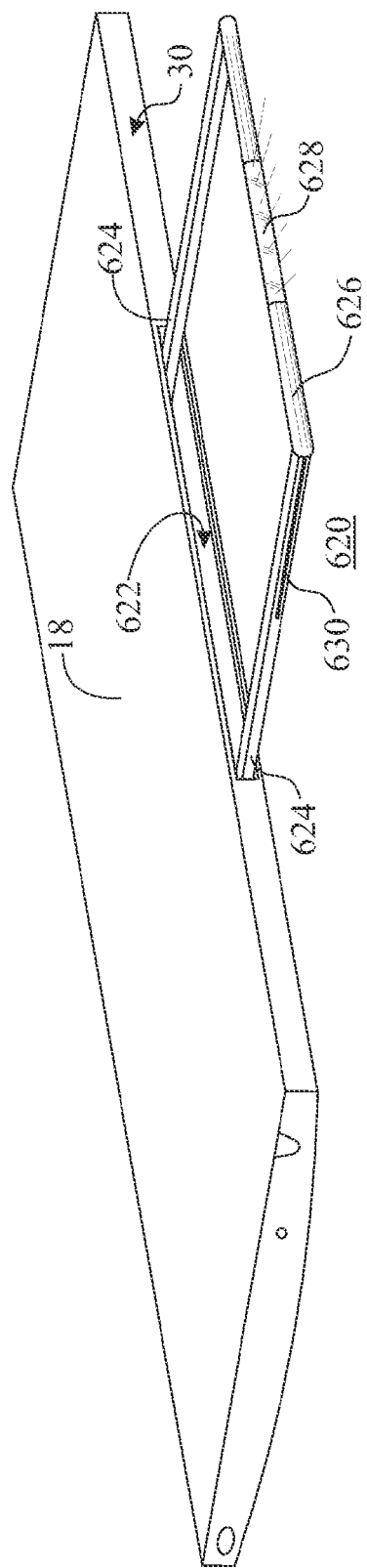
FIG. 21 illustrates a slide-able, pullout tailgate extension positioned within the tailgate.

FIG. 21 is an isometric view of a slide-able tailgate extension & safety light assembly 620; wherein said slide-able tailgate extension & safety light assembly 620 is stored within said vehicle tailgate 18. Said slide-able tailgate extension & safety light assembly 620 pulls out of a slide-able tailgate extension pocket 622 within the tailgate top surface 30. Said slide-able tailgate extension & safety light assembly 620 comprising a number of components. Said slide-able tailgate extension & safety light assembly 620 comprising a slide-able tailgate extension & safety light frame 624 and a slide-able tailgate extension & safety light support bar 626. A slide-able tailgate extension safety light 628 is integrated into said slide-able tailgate extension & safety light support bar 626. Said slide-able tailgate extension safety light 628 would illuminate upon any number of scenarios: when the tailgate is lowered, when the slide-able tailgate extension & safety light assembly 620 is placed in an extended position, when the vehicles parking/driving lights are illuminated and the like.

Alternately, a reflective material can be used providing similar, although slightly less effective results. A reflective frame side indicator 630 can be utilise, wherein said reflective frame side indicator 630 is preferably a reflective tape.

Figure 22:
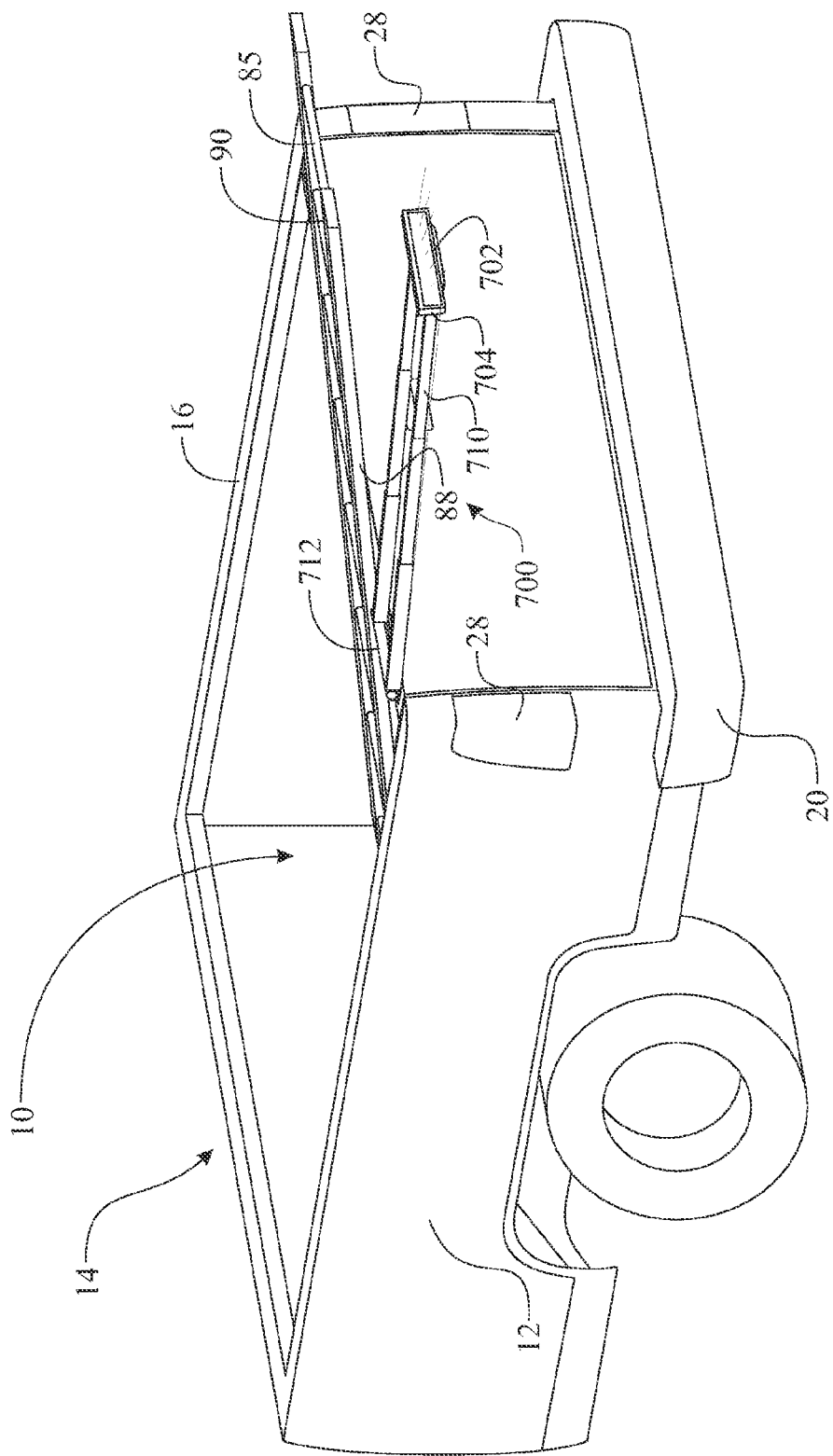
FIG. 22 illustrates a pivotal and telescoping safety light extending from within the tailgate and to a location proximate an end of a projecting object.

FIG. 22 is an isometric view illustrating a telescoping tailgate safety light assembly 700 being integrated into the vehicle tailgate 18. A safety light 702 is provided within a safety light frame 704. The safety light frame 704 is attached to a distal end of a telescoping frame 710. The telescoping frame 710 slides outward from the upper surface of the vehicle tailgate 18 and pivots, using a pivoting member 712, into a horizontal configuration when the tailgate remains in a vertical orientation. The telescoping frame 710 extends positioning the safety light 702 proximate a projected end of an object extending rearward from the vehicle. The telescoping assembly can utilise a single arm, a pair of arms (as shown), and the like. It is understood that the safety light 702 and safety light frame 704 can include detachable features previously presented in FIG. 18.

Figure 23:
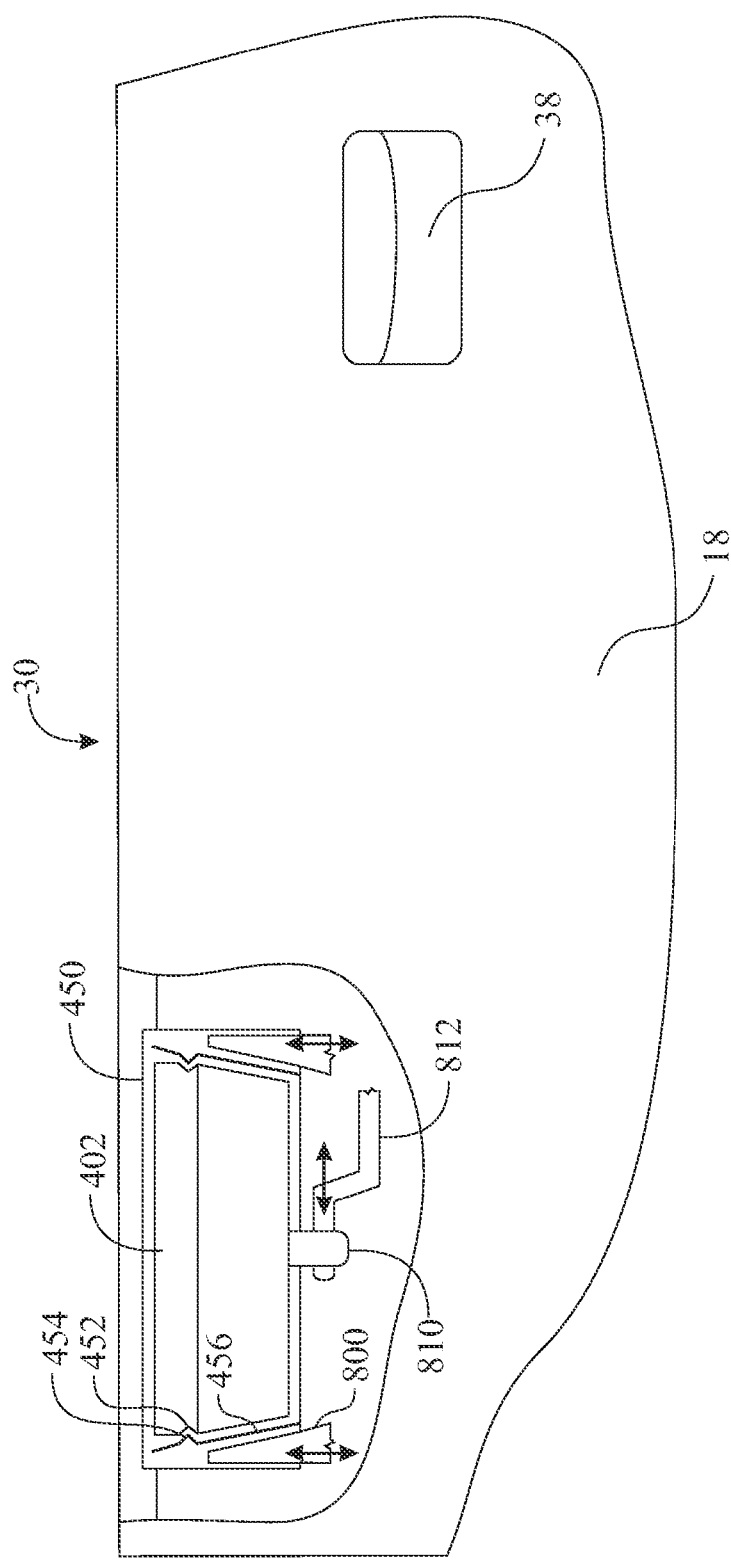
FIG. 23 illustrates optional locking embodiments for securing said removable safety light within a respective housing.

FIG. 23 is a rear view of an exemplary vehicle tailgate 18 having a section of an outer skin removed illustrating two exemplary locking features for securing the primary angle viewing safety taillight 402 within the safety light assembly receptacle 450. A first exemplary locking interface utilizes at least one wedge locking member 800 which is removably inserted between the safety light coupling clip spring 456 and an outer wall of the safety light assembly receptacle 450. The wedge locking member 800 provides a wedge, which limits the motion of the safety light coupling clip spring 456, thus maintaining engagement between the safety light coupling recess 452 and the safety light coupling clip 454. This limitation to the motion of the safety light coupling clip spring 456 retains the primary angle viewing safety taillight 402 within the safety light assembly receptacle 450. A second exemplary locking interface utilizes a moveable locking member 812, which engages with a light lock engaging member 810. The light lock engaging member 810 is assembled to the primary angle viewing safety taillight 402. The moveable locking member 812 can engage within the light lock engaging member 810 in accordance with any known mechanical locking interface. The exemplary embodiment utilizes a moveable locking member 812, which repositions to engage and disengage with the light lock engaging member 810. The moveable locking member 812 comprises a pin that is inserted through an opening formed through the light lock engaging member 810, thus retaining the primary angle viewing safety taillight 402 within the safety light assembly receptacle 450.

It is recognized that accessories such as a bed liner or tailgate protector can be utilised; wherein said protector would comprise an aperture for said tailgate safety light(s).

Additionally, an indicator can be included inside the vehicle to inform the driver that the tailgate assembly is in a lowered orientation.

The illustrations are for presentation purposes and it is recognized that the details and actual reduction to practice may differ depending upon design.

The teachings herein depict the preferred embodiment of the present invention. It can be recognized that although the illustration and specification specifically describes the incorporation of a stepgate operating mechanism as described herein, alternative operating mechanism designs, such as slide bearings, different channels, and the like can be utilised while maintaining the spirit and intent of the present invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A tailgate safety light assembly, said tailgate safety light assembly comprising:
   a pickup truck tailgate being hingable attached to a pickup of a pickup truck, wherein the pickup truck tailgate rotates between a vertical orientation and a horizontal orientation;
   a tailgate safety light integrated into a top surface of pickup truck tailgate;
   a sensor which identifies when said pickup truck tailgate is placed in said horizontal orientation, the sensor being in signal communication with a light control circuit; and
   wherein said light control circuit continuously illuminates said tailgate safety light when said sensor identifies that the pickup truck tailgate is placed in said horizontal orientation.

2. The tailgate safety light assembly of claim 1, wherein said light control circuit is independent of an illumination status of other external lights integrated into said pickup truck.

3. The tailgate safety light assembly of claim 2, said tailgate safety light further comprising at least two levels of intensity, including a low light intensity level and a high light intensity level, wherein said tailgate safety light remains continuously illuminated at said low light intensity level when said sensor which identifies when said pickup truck tailgate is placed in said horizontal orientation.

4. The tailgate safety light assembly of claim 3, wherein said tailgate safety lights are further operated wherein said high light intensity level is continuously illuminated during braking and intermittently illuminated causing a flashing during engagement of a turn signal indicator.

5. The tailgate safety light assembly of claim 3, said tailgate safety light removably engages with a safety light assembly receptacle, wherein said safety light assembly receptacle is integrated into the pickup truck tailgate top surface.

6. The tailgate safety light assembly of claim 1, said tailgate safety light removably engages with a safety light assembly receptacle, wherein said safety light assembly receptacle is integrated into the pickup truck tailgate top surface.

7. The tailgate safety light assembly of claim 6, said tailgate safety light further comprising a rechargeable battery and a disengageble electrical interface between the tailgate safety light and the safety light assembly receptacle.

8. The tailgate safety light assembly of claim 6, said tailgate safety light further comprising a red lens providing color for the taillight and a clear lens located on a side providing a clear light for a flashlight.

9. A tailgate safety light assembly, said tailgate safety light assembly comprising:
   a pickup truck tailgate being hingable attached to a pickup of a pickup truck, wherein the pickup truck tailgate rotates between a vertical orientation and a horizontal orientation;
   a safety light assembly receptacle integrated into a top surface of pickup truck tailgate; and
   a removable safety light assembly being removably inserted into the safety light assembly receptacle wherein the removable safety light assembly is designed to illuminate in both an engaged configuration, where the removable safety light assembly is engaged with the safety light assembly receptacle and in a separated configuration, where the removable safety light assembly is removed from the safety light assembly receptacle.

10. The tailgate safety light assembly of claim 9, said tailgate safety light further comprising at least two levels of intensity, including a low light intensity level and a high light intensity level.

11. The tailgate safety light assembly of claim 10, wherein said tailgate safety lights are further operated wherein said high light intensity level is continuously illuminated during braking and intermittently illuminated causing a flashing during engagement of a turn signal indicator.

12. The tailgate safety light assembly of claim 9, said tailgate safety light further comprising a rechargeable battery and a disengageble electrical interface between the tailgate safety light and the safety light assembly receptacle.

13. The tailgate safety light assembly of claim 12, said tailgate safety light further comprising a switch for operating the tailgate safety light in a solid mode and a flash mode.

14. The tailgate safety light assembly of claim 12, said tailgate safety light further comprising a red lens providing color for the taillight and a clear lens located on a side providing a clear light for a flashlight.

15. The tailgate safety light assembly of claim 14, said tailgate safety light further comprising a switch for operating the tailgate safety light in a solid mode respective to the clear lens and a flash mode respective to illuminating the red lens.

16. A tailgate safety light assembly, said tailgate safety light assembly comprising:

a pickup truck tailgate being hingable attached to a pickup of a pickup truck, wherein the pickup truck tailgate rotates between a vertical orientation and a horizontal orientation;

a safety light assembly receptacle integrated into a top surface of pickup truck tailgate; and a removable safety light assembly powered by a portable rechargeable power source and is removably inserted into the safety light assembly receptacle;

a sensor which identifies when said pickup truck tailgate is placed in said horizontal orientation, the sensor being in signal communication with a light control circuit; and wherein said light control circuit continuously illuminates said tailgate safety light when said sensor identifies that the pickup truck tailgate is placed in said horizontal orientation.

17. The tailgate safety light assembly of claim 16, wherein said light control circuit is independent of an illumination status of other external lights integrated into said pickup truck.

18. The tailgate safety light assembly of claim 17, said tailgate safety light further comprising at least two levels of intensity, including a low light intensity level and a high light intensity level, wherein said tailgate safety light remains continuously illuminated at said low light intensity level when said sensor which identifies when said pickup truck tailgate is placed in said horizontal orientation.

19. The tailgate safety light assembly of claim 16, said tailgate safety light further comprising a red lens providing color for the taillight and a clear lens located on a side providing a clear light for a flashlight.

20. The tailgate safety light assembly of claim 19, said tailgate safety light further comprising a switch for operating the tailgate safety light in a solid mode respective to the clear lens and a flash mode respective to illuminating the red lens.

* * * * *